United States Patent
Han et al.

(10) Patent No.: US 12,516,018 B2
(45) Date of Patent: Jan. 6, 2026

(54) SOLID-SOLID PHASE CHANGE AROMATIC AZO COMPOUNDS, METHOD OF MANUFACTURE, AND USE FOR THERMAL ENERGY STORAGE AND RELEASE

(71) Applicant: Brandeis University, Waltham, MA (US)

(72) Inventors: Grace G.D. Han, Belmont, MA (US); Xiang Li, Waltham, MA (US)

(73) Assignee: BRANDEIS UNIVERSITY, Waltham, MA (US)

( * ) Notice: Subject to any disclaimer, the term of this patent is extended or adjusted under 35 U.S.C. 154(b) by 111 days.

(21) Appl. No.: 18/620,377

(22) Filed: Mar. 28, 2024

(65) Prior Publication Data
US 2025/0074870 A1  Mar. 6, 2025

Related U.S. Application Data

(60) Provisional application No. 63/493,208, filed on Mar. 30, 2023.

(51) Int. Cl.
*C07C 245/08* (2006.01)
*C08K 5/23* (2006.01)

(52) U.S. Cl.
CPC ............. *C07C 245/08* (2013.01); *C08K 5/23* (2013.01)

(58) Field of Classification Search
CPC .................................. C07C 245/08; C08K 5/23
(Continued)

(56) References Cited

U.S. PATENT DOCUMENTS

| | | | | |
|---|---|---|---|---|
| 2,977,334 A | * | 3/1961 | Zopf, Jr. ................ | C08F 8/00 |
| | | | | 525/379 |
| 3,925,326 A | * | 12/1975 | Logothetis .............. | C08F 10/00 |
| | | | | 526/329 |

(Continued)

FOREIGN PATENT DOCUMENTS

| WO | WO-2021158638 A1 * | 8/2021 | ........... C07D 231/38 |
|---|---|---|---|
| WO | 2022169879 A1 | 8/2022 | |

OTHER PUBLICATIONS

Li, Xiang, et al., "Light-Responsive Solid-Solid Phase Change Materials for Photonand Thermal Energy Storage", ACS Materials, Aug. 2023, 3, pp. 37-42.

*Primary Examiner* — Claire E Rojohn, III
(74) *Attorney, Agent, or Firm* — CANTOR COLBURN LLP

(57) ABSTRACT

A compound of Formula (I) for energy storage,

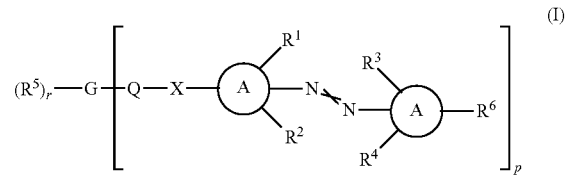

wherein each of $R^5$ and $R^6$ is independently $C_{1-6}$ alkyl, $C_{1-6}$ alkoxy, halogen, trihalomethyl, or cyano; G is a $C_{2-36}$ hydrocarbon, preferably a cyclic hydrocarbon; Q is —C(O)O—, —C(S)O—, —C(O)NH—, —C(O)S—, —C(S)NH—, —NHC(O)NH—, —NHC(S)NH—, or —C(O)NHC(O)—; X is a bond or a $C_{1-30}$ straight- or branched-chain, saturated or unsaturated hydrocarbon;

(Continued)

are each independently aryl or heteroaryl 5- or 6-membered rings; each of $R^1$, $R^2$, $R^3$, and $R^4$ is in an ortho position to the azo group, and is independently halogen, $C_{1-6}$ alkoxy, $C_{1-6}$ alkylthio, halomethyl, dihalomethyl, trihalomethyl, or di($C_{1-6}$ alkyl)amino; r is 0 to 6; and p is 1 to 10, or 2 to 8, or 2 to 6, or 4 to 6, provided that r+p does not exceed the valence of G.

21 Claims, 8 Drawing Sheets

(58) Field of Classification Search
USPC .......................................................... 165/10
See application file for complete search history.

(56) References Cited

U.S. PATENT DOCUMENTS

| | | | | |
|---|---|---|---|---|
| 5,252,675 | A * | 10/1993 | Moteki | C08F 8/14 525/298 |
| 7,179,301 | B2 * | 2/2007 | Vidal | A61K 8/4913 514/408 |
| 8,587,945 | B1 * | 11/2013 | Hartmann | H01L 23/42 361/720 |
| 10,370,467 | B2 * | 8/2019 | Miura | C08F 210/16 |
| 11,015,060 | B2 * | 5/2021 | Ishiwata | C08L 101/025 |
| 11,773,266 | B2 * | 10/2023 | Ishiwata | C08L 101/12 526/72 |
| 2010/0264353 | A1 * | 10/2010 | Hartmann | D06M 15/273 525/54.23 |
| 2016/0223269 | A1 * | 8/2016 | Hartmann | B32B 27/00 |
| 2018/0193314 | A1 * | 7/2018 | Zheng | A61K 31/519 |
| 2018/0327385 | A1 * | 11/2018 | Kuang | A61K 31/497 |
| 2018/0362530 | A1 * | 12/2018 | Ali | A61P 25/14 |
| 2022/0305035 | A1 * | 9/2022 | Roecker | A61K 31/427 |

* cited by examiner

SOLID-SOLID PHASE CHANGE AROMATIC AZO COMPOUNDS, METHOD OF MANUFACTURE, AND USE FOR THERMAL ENERGY STORAGE AND RELEASE

CROSS-REFERENCE TO RELATED APPLICATION

This application is a nonprovisional filing claiming the benefit of U.S. Provisional Application Ser. No. 63/493,208, filed Mar. 30, 2023, the entire contents of which are herein incorporated by reference.

STATEMENT OF GOVERNMENT SUPPORT

This invention was made with government support from the National Science Foundation under grant 2142887 and AFRL/IF FA9550-22-1-0254). The U.S. government has certain rights in this invention.

BACKGROUND

Disclosed herein are solid-solid phase change aromatic azo compounds, methods of their manufacture, and uses thereof.

Photo-induced molecular transformations, in particular reversible photo-mechanical isomerizations, have attracted significant attention as a potential method for harnessing solar energy. A particular class of molecules, referred as molecular solar thermal storage (MOST) systems, respond to light by conformational and energetic changes. MOST molecules present an opportunity to store photon energy in constrained chemical bonds, and then upon triggering release the energy in the form of heat. MOST systems can accordingly be used as a heat-storage material for use in heat-storage devices such as thermal batteries.

BRIEF SUMMARY

Disclosed herein is a compound of Formula (I)

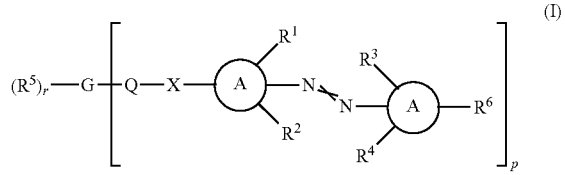

wherein
each of $R^5$ and $R^6$ is independently $C_{1-6}$ alkyl, $C_{1-6}$ alkoxy, halogen, trihalomethyl, or cyano;
G is a $C_{2-36}$ hydrocarbon, preferably a cyclic hydrocarbon;
Q is —C(O)O—, —C(S)O—, —C(O)NH—, —C(O)S—, —C(S)NH—, —NHC(O)NH—, —NHC(S)NH—, or —C(O)NHC(O)—;
X is a bond or a $C_{1-30}$ straight- or branched-chain, saturated or unsaturated hydrocarbon;

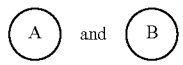

are each independently aryl or heteroaryl 5- or 6-membered rings;
each of $R^1$, $R^2$, $R^3$, and $R^4$ is in an ortho position to the azo group, and is independently halogen, $C_{1-6}$ alkoxy, $C_{1-6}$ alkylthio, halomethyl, dihalomethyl, trihalomethyl, or di($C_{1-6}$ alkyl)amino;
r is 0 to 6; and
p is 1 to 10, or 2 to 8, or 2 to 6, or 4 to 6, provided that r+p does not exceed the valence of G.

Also disclosed compositions including the compound of Formula (I). In particular, a composition comprises, consists of, or consists essentially of, a compound of Formula (I) or Formula (Ia), preferably wherein the composition is a solid composition, more preferably wherein the composition is a solid composition in the form of a film.

A composite structure comprising a porous structural component and a compound of Formula (I) are described.

A method of storing energy includes providing an energy storage device comprising the compounds of Formula (I), the composition, or the composite structure as a thermal-storage material, wherein the compound of Formula (I) is present as an E-isomer; activating the compound of Formula (I) to produce a Z-isomer thereof; and storing the Z-isomer of the compound of Formula (I) for a period of time. The method can further include inducing the Z-isomer of the compound of Formula (I) to isomerize back to E-isomer state, to release energy stored during the activating.

A thermal storage system is described that includes the compound of Formula (I), the composition including the compound of Formula (I) or the composite including the compound of Formula (I).

A process for preparation of a compound of Formula (I) is also described.

The above described and other features are exemplified by the following figures, detailed description, examples, and claims.

BRIEF DESCRIPTION OF THE DRAWINGS

The following Figures are exemplary embodiments, which are provided to illustrate the present disclosure. The Figures are not intended to limit devices made in accordance with the disclosure to the materials, conditions, or process parameters set forth herein.

FIG. 2 also shows UV-vis absorption spectra of (c) compound 1 and (d) compound 3 measured in thin films.

DETAILED DESCRIPTION

Figures 1A, 1B, 1C:
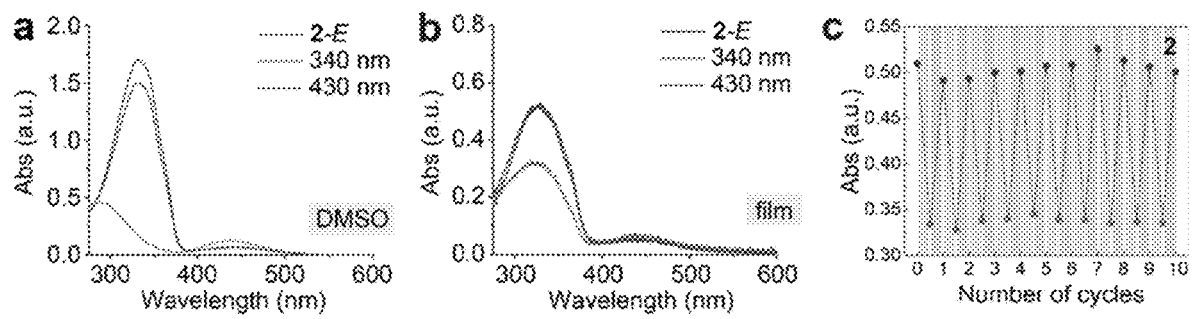
FIG. 1A shows UV-vis absorption spectra of compound 2 as prepared (black), after irradiation at 340 nm (red), and 430 nm (blue) measured in DMSO solutions (0.02 mM).
FIG. 1B shows UV-vis absorption spectra of compound 2 measured in thin films.
FIG. 1C shows absorption changes of compound 2 at 330 nm upon the repeated irradiation at 340 nm (purple filled area) and 430 nm (blue filled area) in thin films.

MOST systems have a number of advantages in the conversion and storage of light to heat energy, including an absence of byproducts and recyclability. In addition, some MOST systems have the capability of isomerizing in condensed phases (i.e., solid to liquid). This has significant advantages over systems that operate in a gaseous phase. Among various photoswitch designs known to date, including norbornadienes, dihydroazulenes, hydrazones, spiropyrans, donor-acceptor Stenhouse adducts, and fulvalene diruthenium complexes, azobenzene and its derivatives have been extensively explored for MOST energy storage, due at least in part to its ease of synthesis and derivatization, tunable optical properties and thermal half-lives ($t_{1/2}$), and reversible isomerization over many cycles with little degradation. Azobenzene derivatives also undergo large structural and polarity changes upon E-Z isomerization, which often results in the phase transition between the crystalline E and liquid Z isomers. The photoinduced phase transition favorably increases the total energy storage density; in addition to $\Delta H_{iso}$, phase transition energy is stored during the E to Z isomerization.

This strategy of incorporating solid-liquid phase transition to isomerization has been widely investigated for azobenzenes and azoheteroarenes typically functionalized with alkyl chains. These phase-transition MOST compounds exhibit large energy densities over 300 J/g, which may allow their use for practical energy applications. However, such solid-liquid phase transition has critical challenges that need to be addressed for successful applications. First, the potential leakage of organic liquid increases the risk of combustion, which is also considered as a major limitation for common organic phase change materials such as paraffins and fatty acids used for thermal energy storage. Strategies including the encapsulation of liquid phase have been developed, but the use of encapsulating polymers and carbonaceous materials that do not contribute to energy storage lowers the overall gravimetric energy density of the system. Second, the UV-induced liquefaction is often unsuccessful at room temperature. Due to the strong π-π interactions between the azobenzenes and the van der Waals interactions among the alkyl chains in the crystalline phase, the conformational freedom of azobenzene is limited, and the large geometrical change of azobenzene is not accommodated in the crystals. Therefore, the initial heating and melting of the E crystals are necessary to facilitate the E→Z isomerization and the formation of the Z liquid, which limits the temperature range within which photon energy can be stored in such compounds.

To address these challenges of the solid-liquid phase transition photoswitches, a new design of MOST materials that undergo solid-solid phase transition at room temperature have been developed. The strategy involves the placement of 3D molecular separators in the solid matrix of azobenzene switches, which reduces the packing density of photochromes and allows the isomerization to occur at room temperature in the crystalline phase. The choice of adamantane as a 3D separator enables the tetrahedral placement of azobenzenes and lowers the degree of intermolecular π-π interactions. The covalent linkage between the adamantane core and azobenzene groups is essential; the noncovalent mixing between the azobenzene and adamantane units would result in phase separation and create close-packed azobenzene crystals that cannot switch at room temperature. The distance between azobenzene and adamantane can be modulated by adding alkyl linkers, which tunes the degree of intermolecular interactions and leads to the formation of different crystalline phases.

In particular, a compound of Formula (I) has been discovered to undergo a solid-solid E-to-Z conversion in the presence of solar light.

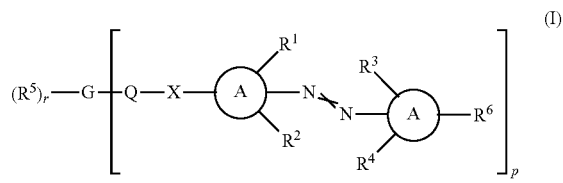

(I)

In Formula (I), each $R^5$ and $R^6$ is independently $C_{1-6}$ alkyl, $C_{1-6}$ alkoxy, halogen, trihalomethyl, or cyano. In an aspect in Formula (I), each $R^5$ and $R^6$ is independently $C_{1-3}$ alkyl, $C_{1-3}$ alkoxy, halogen, trihalomethyl, or cyano. In another aspect in Formula (I), each $R^5$ and $R^6$ is independently methyl, methoxy, chlorine, fluorine, or trifluoromethyl. In any of the foregoing aspects, each of $R^5$ and $R^6$ is the same. Alternatively, of $R^5$ and $R^6$ is different.

Further in Formula (I), G is a $C_{2-36}$ hydrocarbon, preferably a cyclic hydrocarbon having one or more cyclic structures and a valence of p. Each cyclic structure can be linked by a single bond, fused or bridged, or a combination of single linking bond, fusions, or bridged structures can be present. The group G can be saturated, unsaturated (which includes polyunsaturated), or include aromatic groups, or any combination thereof. In an aspect in Formula (I), G is a saturated or unsaturated $C_{6-36}$ monocyclic or polycyclic hydrocarbon, preferably having rigidity and a three-dimensional conformation. The polycyclic hydrocarbon can have 1, 2, 3, 4, 5, 6, or more cyclic groups. Without being bound by theory, it is believed that use of a G group having rigidity and a three-dimensional conformation provides the advantage of the solid-solid phase change. For example, G can be adamantyl, triptycene, or tetraphenylmethane.

Further in Formula (I), Q and X together form a linking group between G and the photoactive moiety, wherein Q can be a functional group such as —C(O)O—, —C(S)O—, —C(O)NH—, —C(O)S—, —C(S)NH—, —NHC(O)NH—, —NHC(S)NH—, or —C(O)NHC(O)—. In an aspect in Formula (I), Q is —C(O)O— or —C(O)NH—. In another aspect in Formula (I), Q is —C(O)NH—.

Further in Formula (I), X is a bond or a $C_{1-30}$ straight- or branched-chain, saturated or unsaturated (including polyunsaturated hydrocarbon. In an aspect in Formula (I), X is a bond. In another aspect in Formula (I), X is $C_{1-30}$ straight-chain, saturated or unsaturated hydrocarbon. In an aspect in Formula (I), X is a $C_{2-20}$ saturated or unsaturated hydrocarbon. In another aspect in Formula (I), X is a $C_{1-12}$ straight-chain, saturated hydrocarbon.

Further in Formula (I),

are each independently aryl or heteroaryl 5- or 6-membered rings. In an aspect in Formula (I),

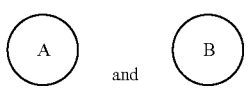

are each independently phenyl, imidazolyl, oxazolyl, isoxazolyl, thiazolyl, or isothiazolyl. In another aspect in Formula (I),

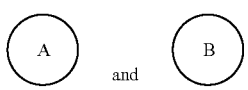

are each the same, or

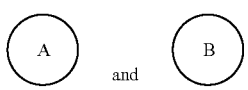

are each the same and are phenyl.

Further in Formula (I), each of $R^1$, $R^2$, $R^3$, and $R^4$ is in an ortho position to the azo group, and is independently halogen, $C_{1-6}$ alkoxy, $C_{1-6}$ alkylthio, halomethyl, dihalomethyl, trihalomethyl, or di($C_{1-6}$ alkyl)amino. In an aspect in Formula (I), each of $R^1$, $R^2$, $R^3$, and $R^4$ is independently the same or different halogen. In another aspect in Formula (I), each of $R^1$, $R^2$, $R^3$, and $R^4$ is the same and is F, Cl, or Br, preferably F or Cl. In an aspect in Formula (I), two of $R^1$, $R^2$, $R^3$, and $R^4$ are F, and the other two of $R^1$, $R^2$, $R^3$, and $R^4$ are C. In another aspect in Formula (I), each of $R^1$, $R^2$, $R^3$, and $R^4$ is independently ethoxy or methoxy, or ach of $R^1$, $R^2$, $R^3$, and $R^4$ is the same and is ethoxy or methoxy.

Still further in Formula (I), r+p does not exceed the valence of G, i.e., the sites available for substitution of G. Where r+p is less than the available sites for substitution in G, those sites are satisfied by a double bond or a hydrogen. For example, r can be 0 to 6. In an aspect, r is 0 to 3. In an aspect in Formula (I), r is 0. Further in Formula (I), p is 1 to 10, In an aspect in Formula (I), 2 to 6. In another aspect in Formula (I), p is 2 to 8 In an aspect in Formula (I), p is 2 to 6. In another aspect in Formula (I), p is 2 to 4, or 3.

In exemplary compounds of Formula (I), each $R^5$ and $R^6$ is independently $C_{1-3}$ alkyl, $C_{1-3}$ alkoxy, halogen, trihalomethyl, or cyano; G is a saturated or unsaturated $C_{6-36}$ polycyclic hydrocarbon; Q is —C(O)O— or —C(O)NH—; X is a bond or a $C_{2-20}$ saturated or unsaturated hydrocarbon;

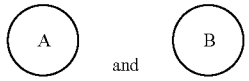

are each independently phenyl, imidazolyl, oxazolyl, isoxazolyl, thiazolyl, or isothiazolyl and re each the same; each of $R^1$, $R^2$, $R^3$, and $R^4$ is halogen, $C_{1-3}$ alkoxy, $C_{1-3}$ alkylthio, halomethyl, dihalomethyl, or trihalomethyl; and r is 0 and p is 2 to 8 or 2 to 6, provided that r+p does not exceed the valence of G.

In other exemplary compounds of Formula (I), each $R^5$ and $R^6$ is independently methyl, methoxy, chlorine, fluorine, or trifluoromethyl; G is adamantyl, triptycene, or tetraphenylmethane; Q is —C(O)O— or —C(O)NH—; X is a bond or a $C_{2-12}$ saturated or unsaturated hydrocarbon;

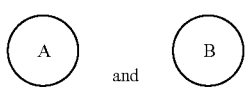

are each the same and are phenyl; each of $R^1$, $R^2$, $R^3$, and $R^4$ is the same and is F or Cl, or two of $R^1$, $R^2$, $R^3$, and $R^4$ are F, and the other two of $R^1$, $R^2$, $R^3$, and $R^4$ are Cl, or each of $R^1$, $R^2$, $R^3$, and $R^4$ is the same and is ethoxy or methoxy; and r is 0 and, p is 2 to 6, or p is 2 to 4, provided that r+p does not exceed the valence of G.

An exemplary compound of Formula (I) is of Formula (Ia)

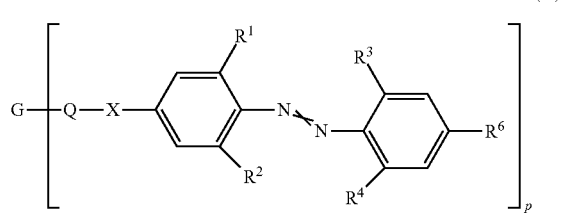

Formula (Ia)

wherein G is a $C_{2-36}$ hydrocarbon, preferably a $C_{8-36}$ monocyclic or polycyclic hydrocarbon; Q is —C(O)O— or —C(O)NH—; X is a single bond or a $C_{1-20}$ straight-chain or branched, saturated or unsaturated hydrocarbon, preferably a $C_{1-6}$ straight-chain alkylene; each of $R^1$, $R^2$, $R^3$, and $R^4$ is independently the same or different halogen; or each of $R^1$, $R^2$, $R^3$, and $R^4$ is the same and is F, Cl, or Br; or each of $R^1$, $R^2$, $R^3$, and $R^4$ is the same and is F or Cl; or two of $R^1$, $R^2$, $R^3$, and $R^4$ are F, and the other two of $R^1$, $R^2$, $R^3$, and $R^4$ are Cl; or each of $R^1$, $R^2$, $R^3$, and $R^4$ is ethoxy or methoxy; and p is 2, 3, 4, 5, 6, 7, 8, 9, or 10, provided that it does not exceed the valence of G.

In an aspect in Formula (Ia), G is a $C_{2-36}$ hydrocarbon, preferably a $C_{10-36}$ polycyclic hydrocarbon; and Q is —C(O)NH— or OC(O)—.

Specific examples of compounds of Formula (Ia) are set forth below in the Examples, and include compounds (1), (2), and (3).

The compound of Formulas (I) and (Ia), in particular compounds (1), (2), and (3), can be manufactured by known methods. For example, a process for preparation of these compounds includes reacting a compound of Formula (II)

(II), wherein $R^5$ and r are as defined in Formulas (I) and (Ia), W is —C(O)$LG_1$-, —C(S)$LG_1$-, —NHC(O)$LG_1$-, —NHC(S)$LG_1$-, —C(O)NHC(O)$LG_1$-, —$NH_2$, or —N=C=Y wherein $LG_1$ is a first leaving group, preferably Cl, Br, imidazolyl, or benzotriazolyl; with a compound of Formula (III)

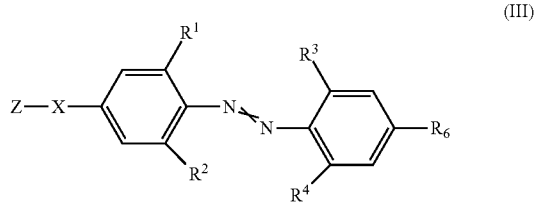
(III)

wherein X, $R^1$, $R^2$, $R^3$, $R^4$, and $R^6$ are as defined in Formulas (I) and (Ia), Z is —OH, —SH, —$NH_2$, or —C(O)$LG_2$ wherein $LG_2$ is a second leaving group, preferably Cl, Br, imidazolyl, or benzotriazolyl, under conditions effective to form the compound according to Formulas (I) and (Ia).

The compound of formula (III) can be prepared, for example, by reacting a compound of Formula (IV)

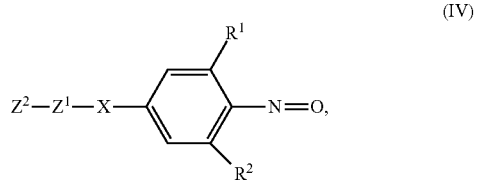
(IV)

wherein, $R^1$, $R^2$, $R^3$, $R^4$, and $R^6$ are as defined in Formulas (I) and (Ia); $Z^1$ is —O—, —S—, —NH—, or —C(O)O—; $Z_2$ is hydrogen or a protecting group; with a compound of formula (V)

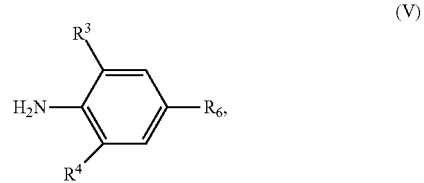
(V)

under conditions effective to form the compound of Formula (III).

Figures 2A, 2B, 2C, 2D:
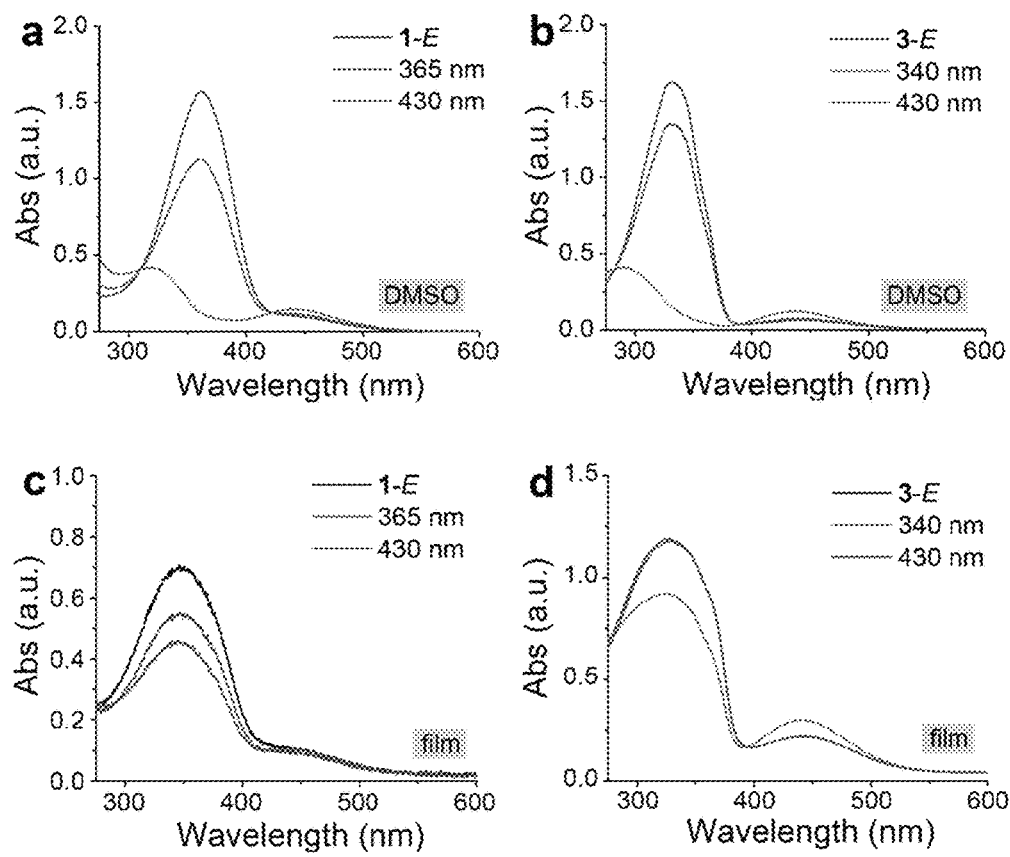
FIG. 2 shows UV-vis absorption spectra of (a) compound 1 and (b) compound 3 as prepared (black), after irradiation at 340/365 nm (red), and 430 nm (blue) measured in DMSO solutions (0.02 mM).

The optical properties of compounds (1), (2), and (3) were examined both in solution and in the solid state, as shown in FIG. 1A and FIG. 1B for compound 2. Compounds 1 and 3 exhibit similar absorption features (FIG. 2).

Figure 3A:
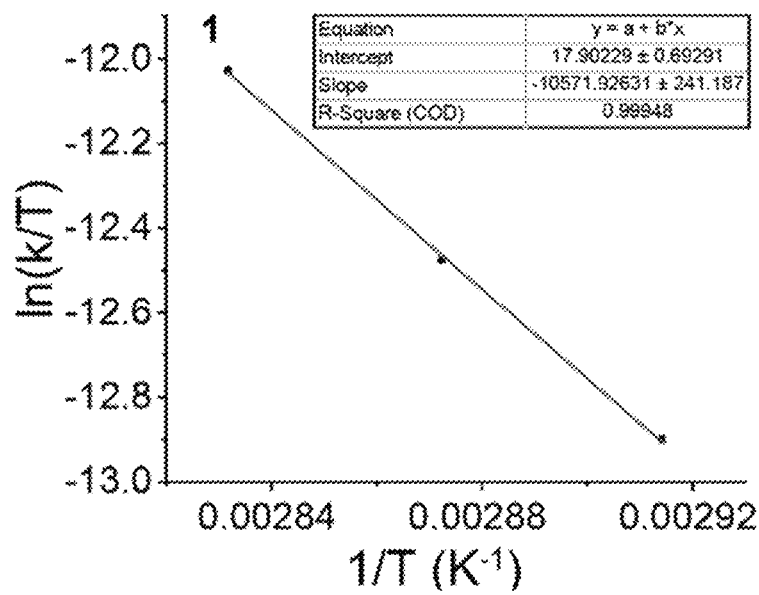
FIGS. 3A, 3B, and 3C show Eyring-Polanyi plots of thermal Z-to-E isomerization of compound 1 (FIG. 3A), compound 2 (FIG. 3B) and compound 3 (FIG. 3C) as measured in DMSO.
Figure 3B:
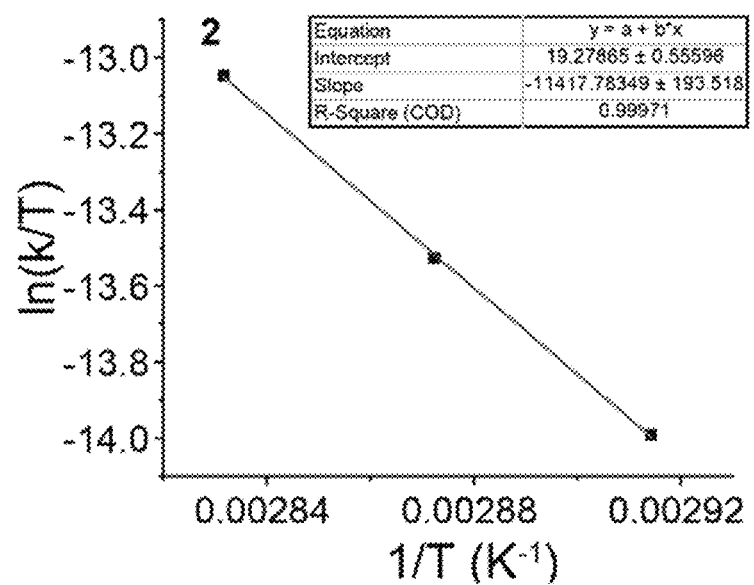
Figure 3C:
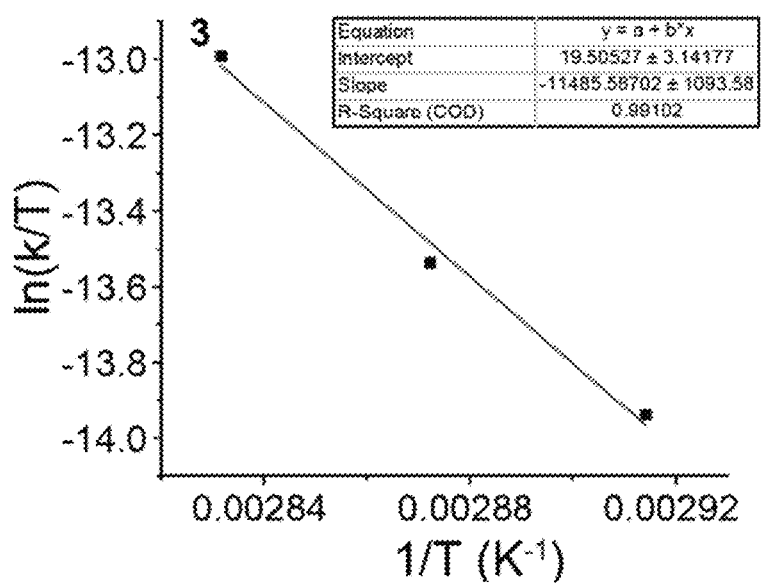

The thermal half-lives of compounds 1, 2, and 3 in solution state were measured in DMSO and vary from 1 to 6 days (FIG. 3A, FIG. 3B, and FIG. 3C, Table 1). Table 1 is a summary of thermal reversion activation energy ($\Delta HH^{\ddagger}$, $\Delta S^{\ddagger}$, $\Delta G^{\ddagger}$) and $t_{1/2}$ of Z isomers of compounds 1-3 at 298 K.

TABLE 1

| | Compound | | |
|---|---|---|---|
| | 1 | 2 | 3 |
| $\Delta HH^{\ddagger}$ (kJ/mol) | 87.9 | 96.6 | 95.9 |
| $\Delta S^{\ddagger}$ (J/mol*$K^{-1}$) | −48.7 | −32.4 | −34.3 |
| $\Delta G^{\ddagger}$ (kJ/mol) | 102.4 | 106.3 | 106.1 |
| $t_{1/2}$ (days) | 1.1 | 5.4 | 5.0 |

Figure 4A:
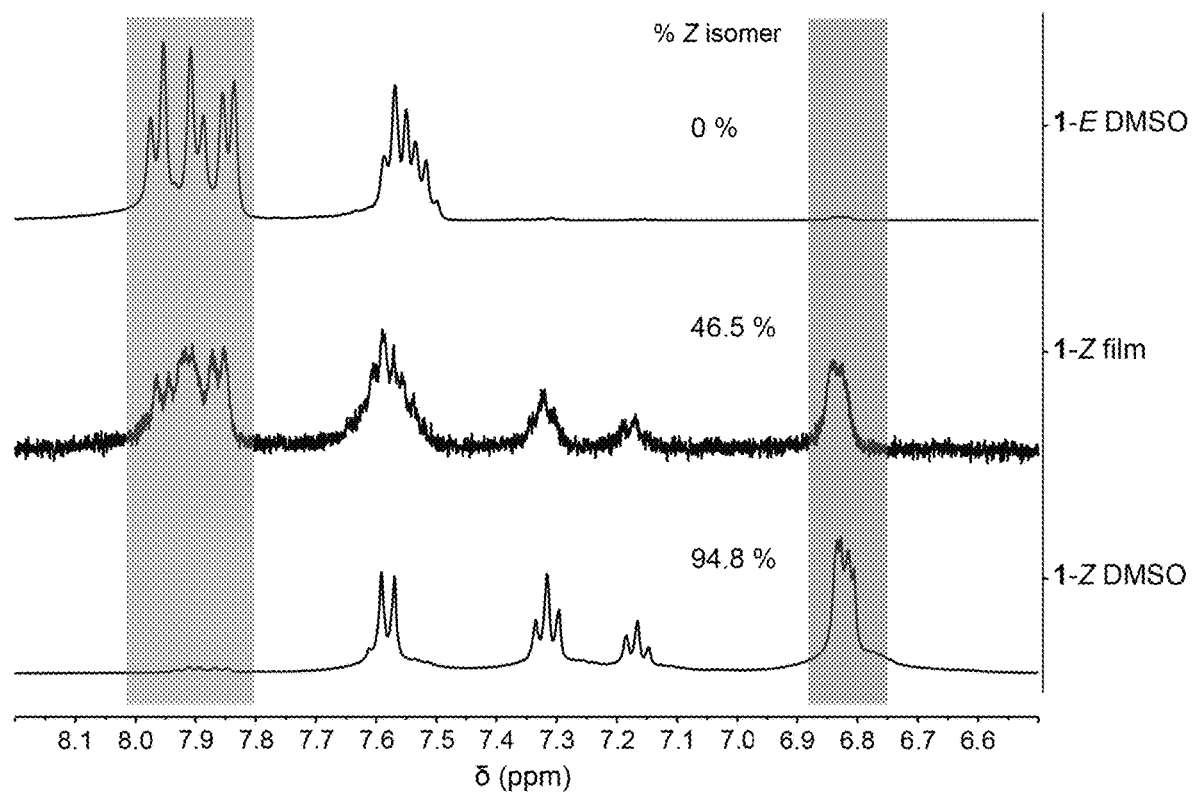
FIG. 4A shows the percentage of compound 1 Z-isomer measured upon 365 nm irradiation in thin film and DMSO, respectively.
Figure 4B:
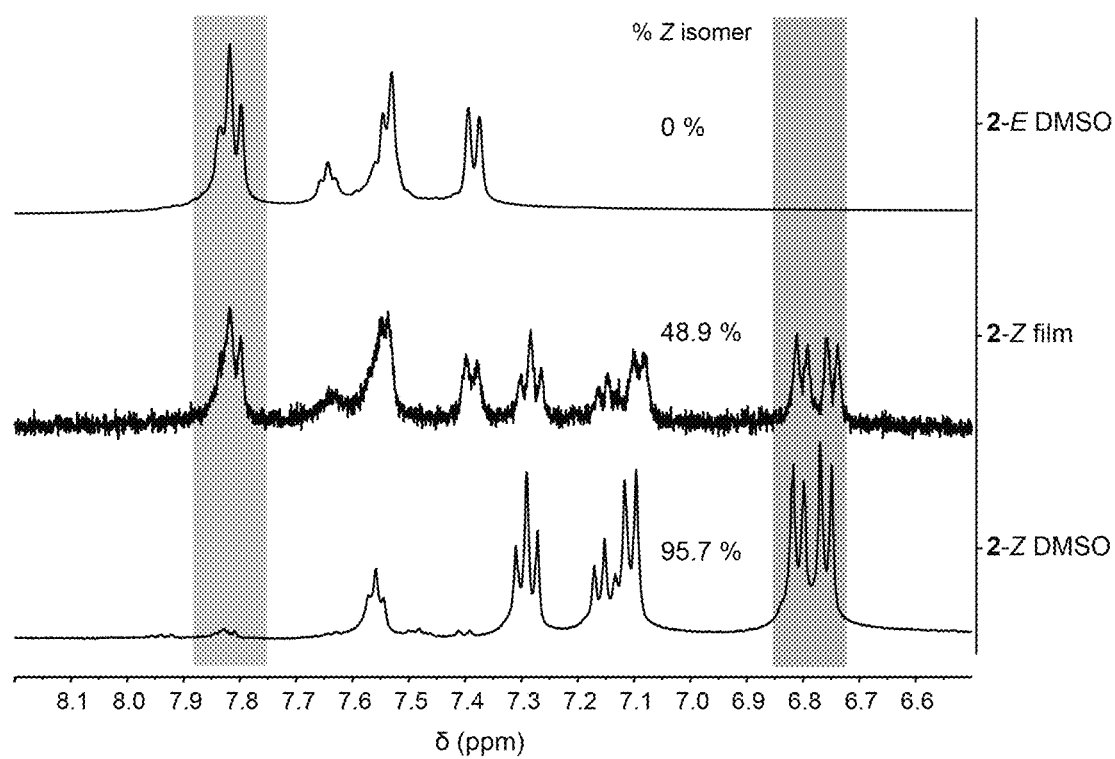
FIG. 4B shows the percentage of compound 2 Z-isomer measured upon 340 nm irradiation in thin film and DMSO, respectively.
Figure 4C:
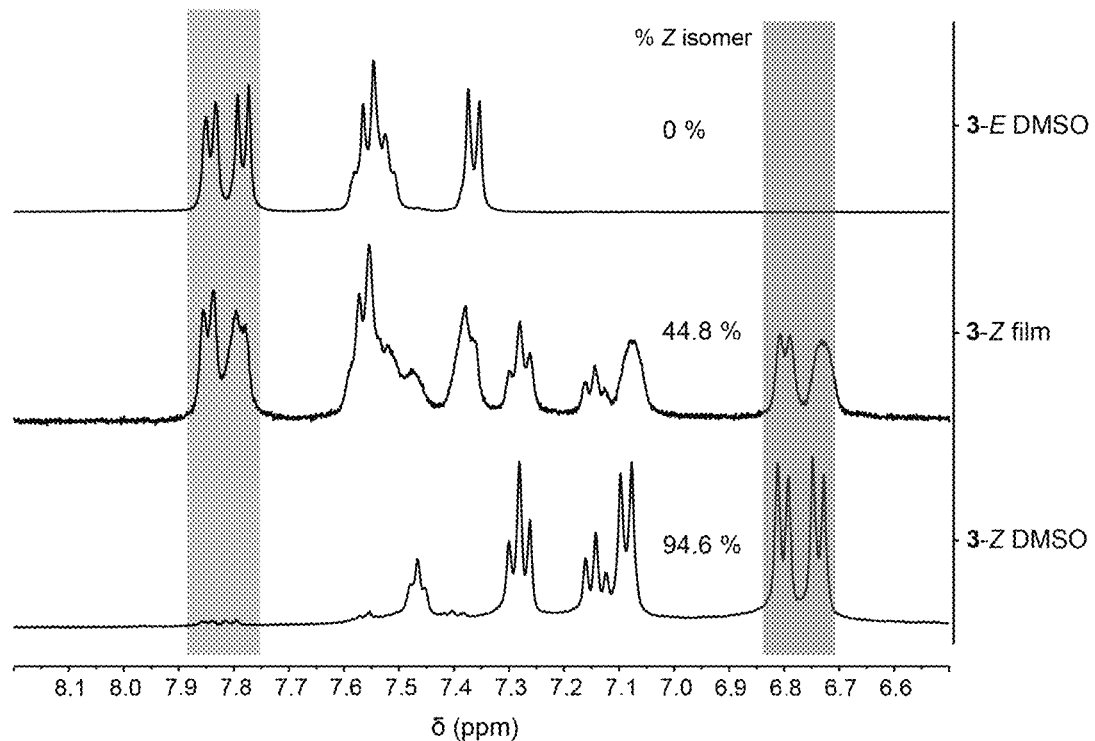
FIG. 4C shows the percentage of compound 3-Z isomer measured upon 340 nm irradiation in thin film and DMSO, respectively. Peaks used to calculate the percentage of Z isomer are highlighted in orange (E) and red (Z).
Figure 5:
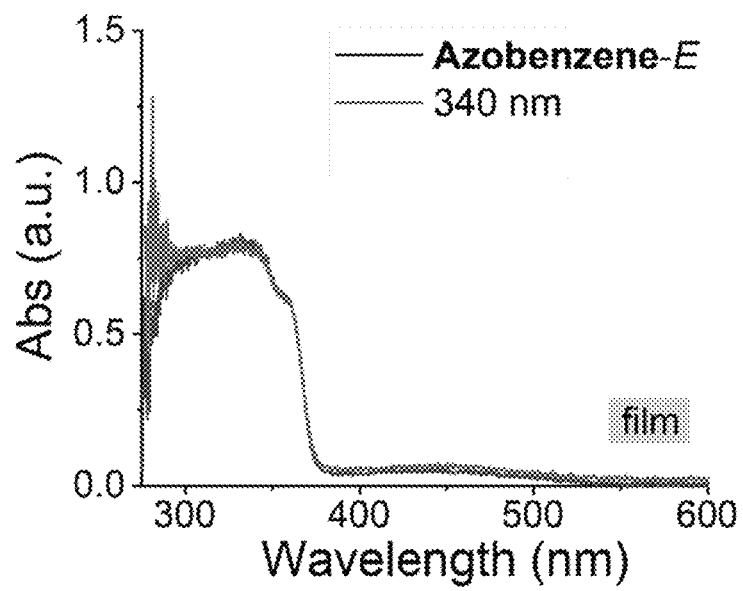
FIG. 5 shows a UV-vis absorption spectra of unsubstituted azobenzene measured in thin films.
Figures 6A, 6B:
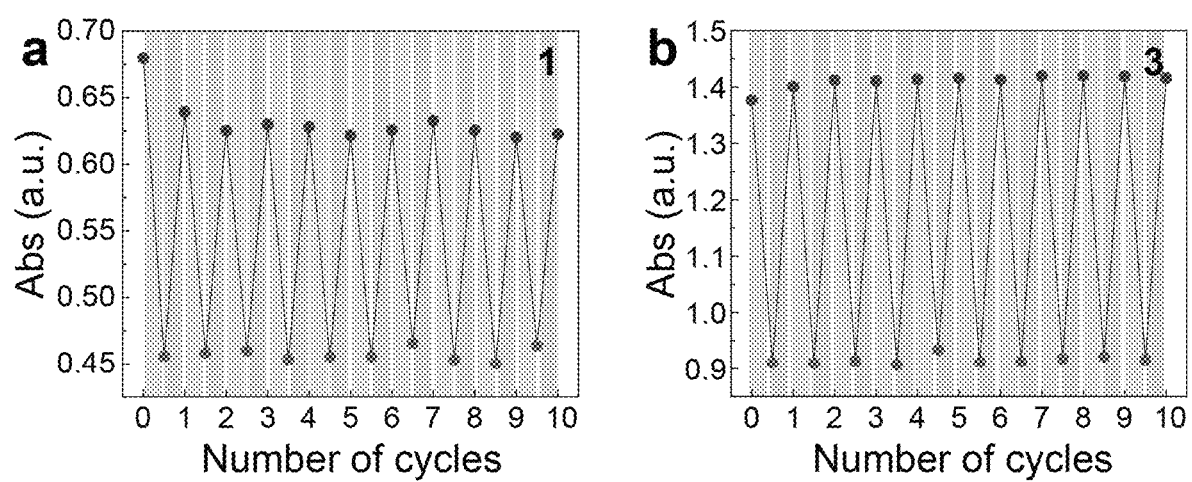
FIG. 6A and FIG. 6B show absorption changes of compound 1 compound 3, respectively at 362/330 nm upon the repeated irradiation at 365/340 nm (purple filled area) and 430 nm (blue filled area) in thin films. Minor fluctuation of absorbance is attributed to the change in the local concentration of photochromes within the film that is induced during the repeated phase transitions.

The absorption spectra of the compounds show π-π* transition centered around 340 nm and n-π* around 430 nm, retaining the characteristics of unsubstituted azobenzene. At the photostationary state (PSS) under irradiation at 340 nm, about 95% Z is obtained in solution, whereas slightly less than 50% Z is acquired in thin films for all compounds (FIGS. 4A, 4B, and 4C). An average thickness of about 1 μm of the films (0.9, 1.3, and 1.1 μm, for Compounds 1, 2, and 3, respectively) was measured by profilometry. The suboptimal PSS ratio for solid-state photoswitches is attributed to the significant overlap between the optical absorption of E and Z isomers, which leads to a small penetration depth of incident light through the condensed phase materials. However, compared to the films of unsubstituted azobenzene at a comparable thickness, which do not allow any solid-state switching (FIG. 5), the about 50% conversion obtained for compounds 1-3 is substantial. This verifies the role of the 3D molecular separator, the adamantane unit, in increasing the conformational freedom of photoswitches in the crystalline solid. The Z→E reversion promoted by the irradiation at 430 nm is more complete in thin films (100%) than in solution (83%), which is attributed to the different polarity of the switching media. In thin films, the alternating irradiation at 340 and 430 nm successfully switches the azobenzene over 10 cycles without any noticeable degradation, confirming its excellent photostability as well as morphological stability that ensures the reversible switching of azobenzene in the confined space within the solid state (FIG. 1C). Both compounds 1 and 3 showed similar cyclability as compound 2 (FIG. 6A and FIG. 6B).

Figures 7A, 7B, 7C:
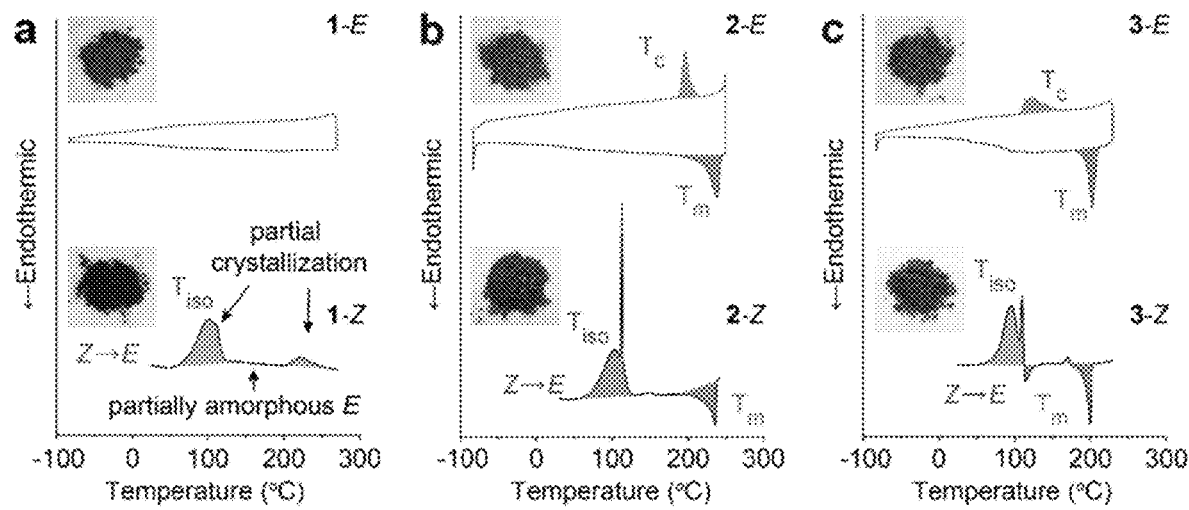
FIG. 7A shows a DSC plot of compound 1.
FIG. 7B shows a DSC plot of compound 2, and FIG. 7C show a DSC plot of compound 3, each in the E and Z isomeric forms. E isomers were heated (black curve) then cooled (red curve) to between −90 and >250° C., and Z isomers were heated from room temperature to monitor Z→E thermal reversion. $T_{iso}$: isomerization peak temperature, $T_c$: crystallization temperature, $T_m$: melting temperature.

As shown in the insets of FIGS. 7A, 7B, and 7C, compounds 1, 2, and 3 appear as an orange powder in E isomeric forms and become a darker orange-red powder when switched to Z isomers. These condensed phase materials were analyzed by differential scanning calorimetry (DSC) to understand their phase transitions and energy storage capacities (Table 2).

TABLE 2[a]

| | E | | | Z → E | | | | |
|---|---|---|---|---|---|---|---|---|
| | Tm (° C.) | Tc (° C.) | ΔHc (J/g) | Tiso (° C.) | ΔHiso (J/g) | ΔHiso (kJ/mol) | ΔHTotal (J/g) | ΔHTotal (kJ/mol) |
| 1 | — | — | — | 101 | 118 | 121 | 139 | 143 |
| 2 | 239 | 195 | 34 | 99 | 107 | 122 | 141 | 161 |
| 3 | 202 | 122 | 31 | 95 | 87 | 109 | 118 | 149 |

[a]Tm: melting temperature,
Tc: crystallization temperature,
ΔHc: crystallization energy,
Tiso: isomerization peak temperature,
ΔHiso: E-Z isomerization energy,
ΔHtotal: total energy storage,
—: unable to measure due to thermal decomposition.

Figure 8:
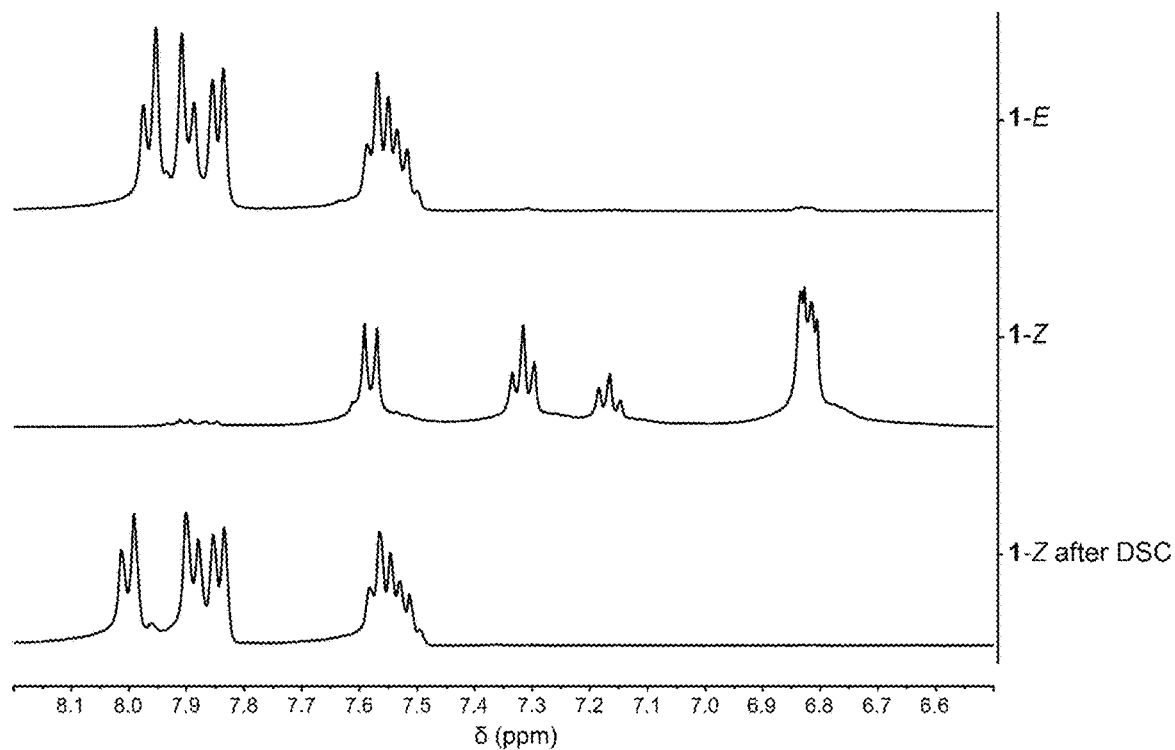
FIG. 8 shows $^1$H NMR of compound 1-Z after DSC measurements compared with $^1$H NMR spectra of 1-E and 1-Z, which confirmed the Z-to-E thermal reversion after the DSC.

Compound 1-E, with the shortest amide linkage between the adamantane separator and azobenzene groups, displays no melting or crystallization features during the heating and cooling cycles of DSC (FIG. 7A). Heating the compound above 260° C. results in thermal decomposition, which infers that compound 1-E has a very high melting point that is difficult to measure under atmospheric pressure. Compound 1-Z shows an exotherm indicating the Z→E thermal reversion, followed by a smaller exotherm above 200° C. The first exothermic peak displays a shoulder above 100° C., which indicates a partial crystallization of E isomer that is generated upon the Z→E isomerization. The second exotherm above 200° C. shows further crystallization of the E isomer from a partially amorphous state, which was not completed at the lower temperature during the reversion, in the mixture of Z and E isomers. Due to the high melting point of 1-E, the subsequent melting after crystallization could not be recorded. Instead, the Z→E thermal reversion after DSC was confirmed by $^1$H NMR. (FIG. 8). Both the isomerization energy ($\Delta H_{iso}$) and phase transition energy ($\Delta Hc$) are stored in the amorphous Z isomer and released upon the triggering of Z→E reversion and simultaneous crystallization.

As shown in FIG. 7B, compound 2 shows clear melting and crystallization points as an E isomer, indicating the crystalline nature of E. On the other hand, the heated Z isomer shows a convoluted exotherm representing Z→E isomerization (broad peak) and subsequent crystallization (sharp peak). The continued heating leads to a melting peak that is identical to that of 2-E, verifying the generation and crystallization of the E isomer upon heating of 2-Z. Compound 2 has an ethyl linker between the adamantane and azobenzene groups. Without being bound by theory it is believed that the flexibility of the alkyl linkers contributes to reducing the intermolecular π-π interactions among azobenzene units and decreases the melting and crystallization points of E isomers.

Figures 9A, 9B, 9C, 9D, 9E, 9F, 9G, 9H, 9I, 9J, 9K, 9L:
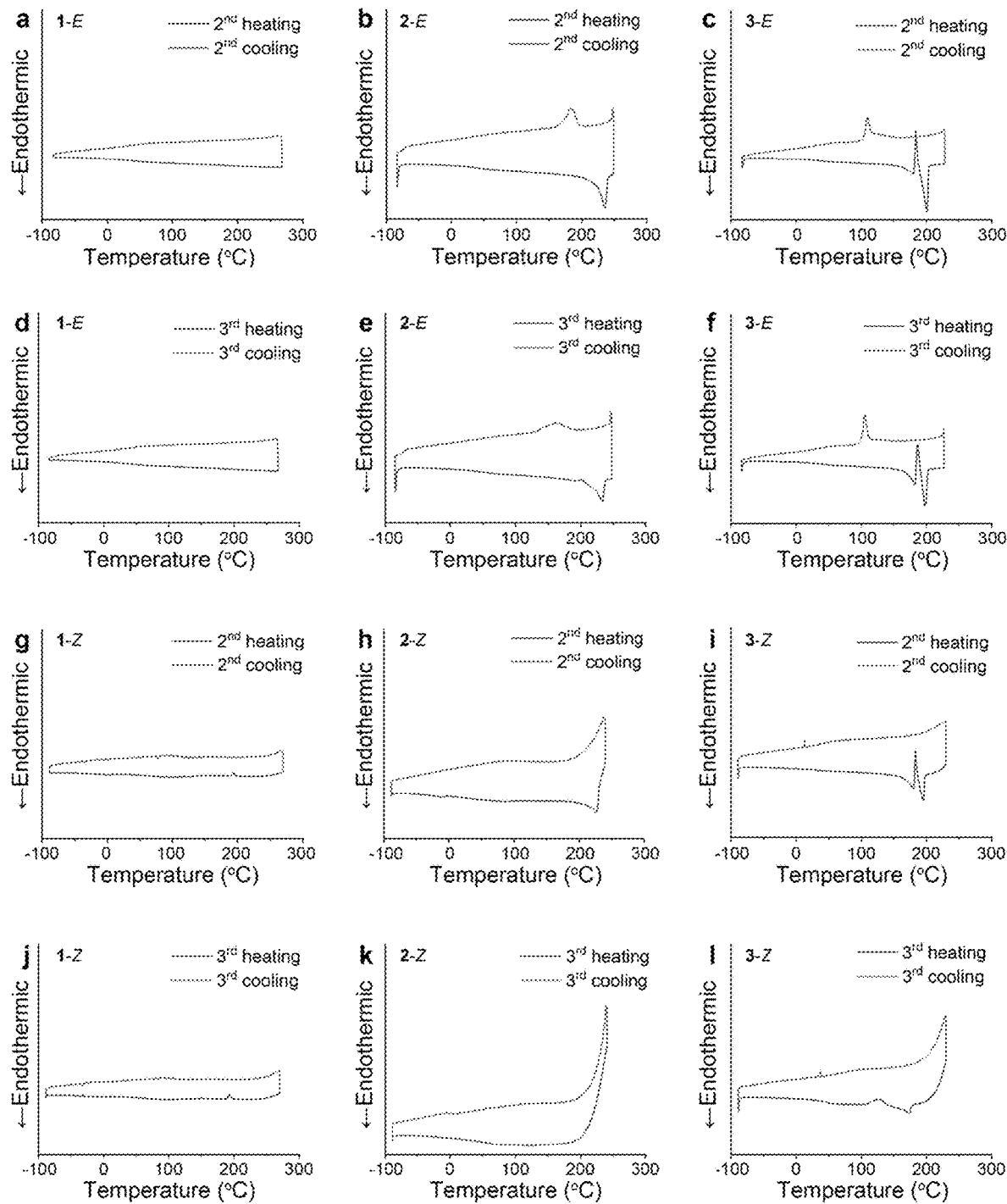
FIG. 9 shows DSC plots of compounds 1 (panels a, d, g, j), 2 (panels b, c, h, k), and 3 (panels c, f, i, l) in the E and Z isomeric forms in their second and third cycles. Thermal decomposition of 2-Z (panels h, k) and 3-Z (panel 1) is monitored by the exothermic change of curves above 200° C.

As shown in FIG. 7C, Compound 3, bearing the longest linker (butyl) shows the lowest melting and crystallization points among the E isomers of compounds 1, 2, and 3, corroborating the hypothesis (Table 2). Compound 3-Z displays an exotherm of Z→E isomerization and an immediate crystallization of E, followed by 1) a minor melting peak, 2) a minor crystallization peak, and 3) a large endotherm representing the melting of 3-E crystal (FIG. 3c). Due to the larger disorder rendered by the long alkyl linkers, the E isomer has polymorphs including a minor crystalline phase with a lower melting point and a major phase with a higher melting point. The polymorphism of compound 3-E is also manifested in its second and third DSC cycles (FIG. 9c, 9f), showing two sets of melting and crystallization points. The second and third cycles of DSC for compounds 1, 2 and 3 are illustrated in FIG. 9.

Based on the integrated exotherms associated with Z→E isomerization and the crystallization of E, the energy storage capacity of compounds (ΔHtotal) can be determined. For compound 1, the isomerization energy ($\Delta H_{iso}$) was estimated by the integration of the exotherm at 101° C., which partially overlaps with a minor crystallization peak and is well separated from the subsequent crystallization peak. For compounds 2 and 3, due to the more significant convolution of the isomerization peak and E crystallization peak, their $\Delta H_{iso}$ values were estimated from the difference between the ΔHtotal and the crystallization energy of E isomers (ΔHc), obtained separately from the cooling of molten E isomers. Compounds 1 and 2 exhibit similar gravimetric ΔHtotal of 139 and 141 J/g, while that of compound 3 is lower (118 J/g), which is attributed to the large molecular weight of compound 3. ΔHtotal per molecule is similar between compounds 1 and 3 (143 and 149 kJ/mol), and compound 2 is the largest (161 kJ/mol). It highlights the significance of solid-solid phase transition in increasing the overall energy storage of the MOST compounds. Upon Z→E reversion, compound 2 immediately crystallizes, releasing the crystallization energy, in addition to $\Delta H_{iso}$ of the molecule. The crystallization process of compound 1 is not as facile, and such process of compound 3 overlaps with the subsequent melting of a minor crystalline phase of E isomer. It concludes that the mechanism of energy storage through E-Z isomerization and the associated phase transition is identical across three compounds, and compound 2 with the most distinct phase transition as shown in the DSC plot (FIG. 7B) is the most desirable solid-state MOST candidate for energy storage applications.

Figures 10A, 10B, 10C:
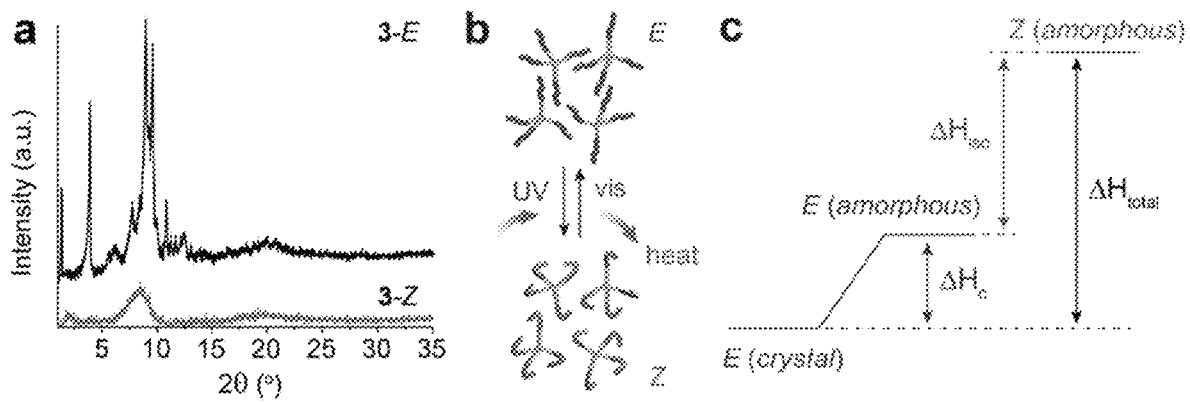
FIG. 10A shows XRD patterns of compound 3 as E and Z isomers.
FIG. 10B shows a schematic illustration of the heat storage and release based on the UV and visible light-induced isomerization and solid-solid phase transition.
FIG. 10C shows and energy diagram showing the relative energy levels of E in the crystalline and amorphous phase and the amorphous Z isomer. $\Delta H_c$: crystallization energy, $\Delta H_{iso}$: E-Z isomerization energy, $\Delta H_{total}$: total energy storage in the Z isomer.
Figures 11A, 11B:
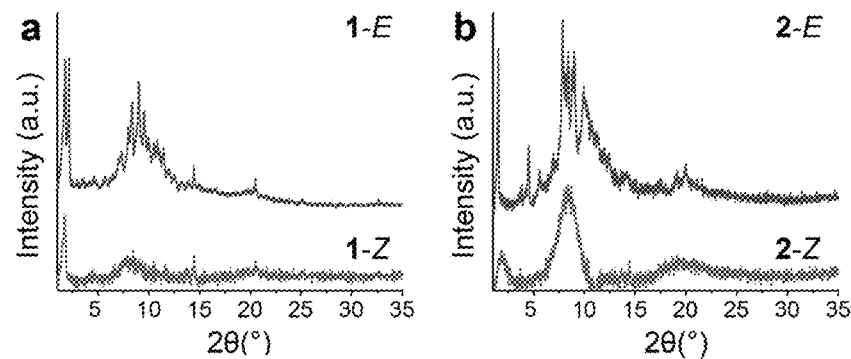
FIG. 11A shows XRD patterns of compound 1 as E and Z isomers.
FIG. 11B shows XRD patterns of compound 2 as E and Z isomers.

The X-ray diffraction patterns of E and Z isomers of compound 3 are shown in FIG. 10A, and corroborate the phase transition observed from the DSC. At room temperature, the E isomer shows multiple peaks of diffraction, indicative of a crystalline phase. The Z isomer, on the other hand, exhibits broad features resulting from an amorphous phase. The other compounds also show a similar crystalline (E) and amorphous (Z) nature by diffraction (FIG. 11A and FIG. 11B).

Figures 12A, 12B, 12C, 12D, 12E, 12F:
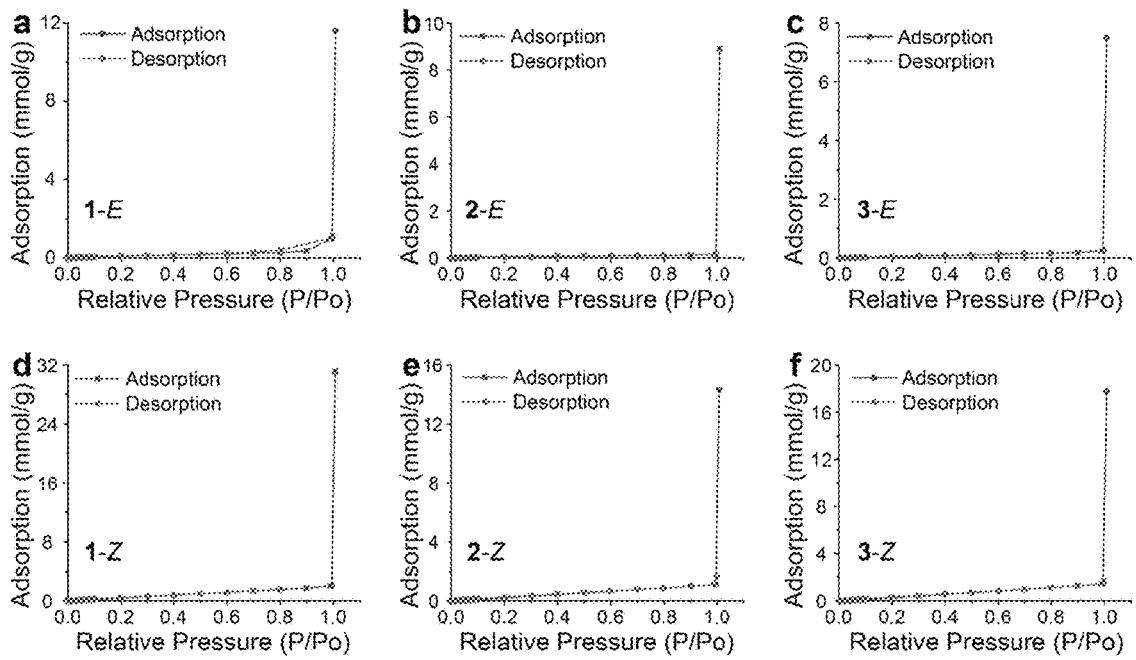
FIG. 12 shows $N_2$ gas adsorption isotherms of E and Z isomers of compounds 1 (panels a, b, and c), compound 2 (panels d, c, and f), and compound 3 (panels g, h, and i), each at 77 K

The gas adsorption measurement of compounds 1, 2, and 3 showed small BET surface areas ranging from 5 to 57 m$^2$/g, verifying their nonporous structures (FIG. 12). Table shows the BET surface area of E and Z isomers of compounds 1, e, and 3.

TABLE 3

| BET surface area (m²/g) | 1 | 2 | 3 |
|---|---|---|---|
| E | 9.2 | 5.2 | 5.9 |
| Z | 56.9 | 33.5 | 41.5 |

FIG. 10B and FIG. 10C summarize key findings i.e., that; the crystalline E isomers undergo the UV-induced isomerization and phase transition to an amorphous Z phase, storing photon and thermal energy. The amorphous Z isomers are triggered by visible light irradiation to revert to the crystalline E, releasing the stored energy as heat. The intermediate, amorphous E state is difficult to isolate in experiments, due to the immediate crystallization of E when generated from the isomerization of Z, as shown in FIG. 7. The overall energy storage in amorphous Z is the combination of ΔHiso, measured in the amorphous phase, and ΔHc of the E isomer, both of which were assessed by DSC. Notably, the contribution of phase transition to the total energy storage is small, compared to that of the isomerization energy. This is in contrast to solid-liquid phase transition photoswitches for which the relative magnitude of isomerization energy and phase transition energy is similar due to the long alkyl chains with substantial van der Waals interactions increasing the phase change energy.

Without being bound by theory, it is believed that the presence of the relatively rigid, three-dimensional separator reduces the intermolecular interactions among the azobenzene moieties, which allows them to undergo a large geometrical change within the crystalline phase without the need for melting the solid before irradiation. This series of MOST compounds that undergo solid-solid phase transition upon switching appears to be unique, in that previously reported solid-state MOST materials, such as azobenzene-functionalized polymers, nanocarbons, and bulky-group-substituted azobenzenes exhibit no phase transition upon photoirradiation, preserving the amorphous nature of the materials. Metal-organic frameworks incorporating photoswitches, on the other hand, typically maintain their crystallinity, despite pore structure changes.

Thus, the aromatic azo compounds, in particular the azobenzene compounds disclosed herein are covalently linked to a group such as an adamantane unit that serves as a 3D molecular separator to reduce the close packing in a crystalline phase. The design of nonporous solid materials enabled the facile E-Z switching of azobenzene in the confined space, due to the spatial arrangement of photochromes, which result in the crystalline-to-amorphous phase transition upon photoswitching. MOST energy storage materials that harness both the isomerization energy of photoswitches as well as their phase transition energy, while maintaining a solid state, would successfully circumvent the need for liquid encapsulation and have important implications in practical solar energy storage devices.

In an embodiment a composition comprises, consists of, or consists essentially of, a compound of Formula (I), specifically of Formula (Ia). In the composition, the compound of Formula (I) specifically Formula (Ia), can be present in the form of a Z-isomer, an E-isomer, or a combination thereof. The composition can consist of a single compound of Formula (I), specifically of Formula (Ia), in a substantially pure form, such as at least about 95% pure, at least about 97% pure, at least about 98% pure, or at least about 99% pure. This is without regard to the (E)/(Z) form of the compound.

Preferably the composition is a solid composition. The solid composition can be of any configuration, but for use in thermal storage devices as described below, is preferably a solid composition in the form of a film. As used herein, a "solid composition" does not substantially melt or flow under conditions of ordinary use, for example in a thermal storage device. For example, irrespective of whether the compound of Formula (I) or Formula (Ia) is in an E- or Z-configuration, the composition does not substantially melt or flow at a temperature of 200° C. or less, or 180° C. or less, or 150° C. or less, or 120° C. or less.

Exemplary components include, without limitation, trace amounts of organic solvents as well as organic phase-change materials (PCM), provided that the type or amount of any additional solvent or PCM does not significantly adversely affect the solid state of the composition as a whole.

Exemplary PCMs for use in the present application include higher molecular weight alkanes (aliphatic hydrocarbons), fatty acids, fatty alcohols, fatty acid esters, paraffin waxes, polyethylene glycols, sugar alcohols, salts of fatty acid, and combinations thereof. They can have an origin derived from animal fat, animal grease, vegetable oil, vegetable wax, synthetic compounds, or a combination thereof.

In certain embodiments, the organic phase-change material comprises one or more of aliphatic hydrocarbons, fatty acids, fatty alcohols, or combinations thereof. The aliphatic hydrocarbons, fatty acid, and fatty alcohol phase change those having a $C_{12-30}$ hydrocarbon chain. The hydrocarbon chain can be saturated or unsaturated, although it is preferably saturated. Suitable fatty acids include those occurring naturally in triglycerides as well as synthetic fatty acids. Fatty acids can be obtained from the hydrolysis of triglycerides, as is well known in the art. Exemplary fatty acids include, but are not limited to oleic acid, palmitic acid, linoleic acid, palmitoleic acid, stearic acid, tridecanoic acid, pentadecanoic acid, heptadecanoic acid, nonadecanoic acid, caprylic acid, capric acid, and lauric acid as well as combinations of two or more thereof. Frequently available fatty acids can be hydrates and hydrogenated acids of any of the preceding acids.

The fatty acid esters can be formed with alcohols, diols, and/or polyols, including mono-, di- or triglycerides of glycerol, esters of pentaerythritol, polyesters of polyhydric alcohols, esters of methanol, ethanol, propanol, butanol, isobutanol, pentanol, hexanol, cyclohexanol, esters or diesters of ethylene glycol and/or combinations of two or more thereof. The fatty acid esters can be mono-, di- or triglycerides of glycerol, and/or combinations thereof. Additionally, the fatty acid esters can be ester of higher fatty acids with higher monohydric alcohols. Esters of fatty acids can be formed by a variety of methods known in the art including transesterification or hydrolysis followed by esterification. The advantage of this approach is that relatively pure components having targeted melting point temperatures can be synthesized. For example, a multitude of esters of oleic acid can be formed by complete esterification with methanol, ethanol, propanol, butanol, isobutanol, pentanol, hexanol, cyclohexanol, phenol, ethylene glycol, glycerin, diethylene glycol, and many more. To a first approximation, the oleate esters formed with each of these esters will result in different melting point temperatures. Furthermore, mixtures of two of the esters have the potential to form mixtures having relatively narrow and useful melting point temperature ranges.

Exemplary fatty alcohols for use as PCMs include, but are not limited to, dodecanol (lauryl alcohol), tetradecanol (myristyl alcohol), hexadecanol (cetyl alcohol), and octadecanol (stearyl alcohol).

In another aspect, the phase change material is a long chain alkane or alkene with minimal branching, or no branching; of these, long chain alkanes with minimal branching are preferred. These hydrocarbons are able to solidify at temperatures above 0° C., and can absorb heat. Alkanes ranging in carbon length from $C_{18-30}$ may be useful. Exemplary alkane PCMs of the present application include, but are not limited to long chain aliphatic such as tetradecane, pentadecane, hexadecane, heptadecane, octadecane, nonadecane, icosane, henicosane, docosane, tricosane, tetracosane, pentacosane, hexacosane, heptacosane, octacosane, nonacosane, and triacontane.

Other PCMS can be used include natural or synthetic polymers such as poly(tert-butyl acrylate), poly(isopropyl methacrylamide), hydroxypropyl cellulose, hydroxymethyl cellulose, poly(oxazoline), and poly(organophosphazenes). Sugar alcohols can be used, such as xylitol, pentraerythritol, trimethylolethane, erythrite, mannitol, neopentyl glycol, or a combination thereof.

The optional organic PCM can be present, if used, in an amount of about 1 to about 30 weight percent (based on the total weight of the composition), again provided that the composition as a whole remains solid. For example, the organic phase-change material can be present in the composition in an amount of about 5 to about 20 weight percent, or about 5 to about 15 weight percent.

In another aspect, the composition can further comprise a natural or synthetic polymer in which the compound of Formula (I), specifically Formula (Ia), is dissolved or dispersed. The polymer is preferably selected to also be a solid that does not substantially melt or flow under conditions of ordinary use, for example in a thermal storage device, such as at a temperature of 200° C. or less, or 180° C. or less, or 150° C. or less, or 120° C. or less. The polymer is further selected to allow the transmission of light, in particular visible light or sunlight when in the form used, for example a film.

The polymer can be, for example, a polyolefin, a polyacrylate, a polymethacrylate, a polymethyl methacrylate, a polyester, a polystyrene, a polyamide, a polyurethane, a polypropylene, a polyethylene, a polytetrafluoroethylene, a polychlorotrifluoroethylene, a copolymer of the foregoing or a combination thereof. Such compositions can be used as functional coatings or functional fabrics. Polymer-based molecular solar thermal system (MOST) can be realized by compounding into existing polymer matrices of the types described above. Further substituents, like carbazole or benzophenones may be attached to the polymer to facilitate the photoisomerization process.

The composition can further comprise other components, provided that such components do not substantially adversely affect the desired properties of the composition, for example transparency to sunlight or visible light. Other components can be, for example, antioxidants, thermal stabilizers, mold release agents, or the like.

The compounds and compositions as described herein can be used to form thermal storage devices, as well as components for thermal storage devices. Although one goal of the compounds and compositions is to eliminate a need for encapsulation or a support, composite structures may be used to form subcomponents of thermal storage devices. In an aspect, a composite structure includes a porous structural component and a compound of Formula (I), specifically Formula (Ia), or a composition including the compound of Formula (I), specifically Formula (Ia). Exemplary porous structural components include, an aerogel, a xerogel, a nanotube, metal organic framework, covalent organic framework, zeolite, graphene, graphene oxide, graphite, transition metal dichalcogenide, or hexagonal boron nitride.

In another embodiment, a thermal storage system includes the composition or the composite structure. Again, preferably the composition is a solid composition, and more preferably the composition is a solid composition in the form of a film. Optionally, the thermal storage system can include a plurality of the compositions, a plurality of the composites, a plurality of the light sources, or a combination thereof. In accordance with yet another embodiment, the thermal-storage device may include the compound Formula (I), specifically of Formula (Ia) or the composition as described herein, where the compound or composition is retained on a substrate. The substrate may optionally include a thermal conducting element to facilitate heat transfer from the compound or composition to another article or the ambient environment during exothermic phase change, as discussed herein. Thermal storage devices/systems that include a compound or composition as described herein can take any of a variety of configurations.

In an exemplary thermal storage system, the composition or the composite structure can be enclosed by compartment comprising an optically transparent portion (e.g., a polymer or a glass) to allow the transmission of sunlight or light in the visible range to impinge on the composition or the composite structure. In accordance with another embodiment, a thermal conducting element forms a portion of the enclosure or the porous structural component.

The thermal storage system can further include one or more of a light source that emits a wavelength of light effective to induce an isomeric phase change of the compound of Formula (I), specifically of Formula (Ia); a switch that controls operation of the light source; and either a power source or a connector adapted for connecting the thermal storage system to a power source. The switch can be a thermo-sensitive switch or a manually operable switch. The power source can be a battery.

In accordance with another embodiment, the thermal storage system can include a reservoir for storing the liquid form of the compound (predominantly comprising the Z-isomer) and a pump.

The thermal-storage device may optionally include a light source, as well as accompanying circuitry controls, to allow the light source to illuminate the disclosed compound or compositions, and thereby induce an isomeric phase-change for the compounds.

In accordance with one embodiment, a thermal-storage device may include a plurality of composition structures and a plurality of light sources. In an embodiment, the light source(s) are LED light source(s).

An example of a thermal storage device is a device that is configured to facilitate heat transfer to engine oil or to stored water in accordance with the embodiments described and/or illustrated in PCT Application Publ. No. WO 2020/227227, which is hereby incorporated by reference in its entirety.

Another example of a thermal-storage device is a solar energy collector, which may optionally include a wavelength converter or an energy converter. Non-limiting examples of energy storage devices, including solar energy storage devices, are described in International Application Publication Nos. WO 2019/106029 A1 and WO 2016/097199 A1; U.S. Application Publication No. 2018/0355234 A1; Moth-Poulsen et al., "Molecular Solar Thermal (MOST)

Energy Storage and Release System," Energy Environ. Sci. 5:8534-8537 (2012); and Kashyap et al., "Full Spectrum Solar Thermal Energy Harvesting and Storage by a Molecular and Phase-Change Hybrid Material," Joule 3(12):3100-3111 (2019), each of which is hereby incorporated by reference in its entirety.

In these systems, it may be desirable to move the composition within the system from locations where the E-isoform can be exposed to solar energy and converted to the Z-isoform, and then moved to a separate location where the Z isoform can be stored and, later, converted to the E-isoform when harvesting the stored energy. Movement of the compounds or compositions can be carried out using conveyers, belts, and the like.

The compound of Formula (I), specifically Formula (Ia), or a composition including the compound of Formula (I), specifically Formula (Ia), or the composite structure can be used as a thermal-storage material. In particular, a method of storing energy includes providing an energy storage device comprising the compound of Formula (I), specifically Formula (Ia), the composition, or the composite structure as a thermal-storage material, wherein the compound of Formula (I), specifically Formula (Ia), is present as an E-isomer; activating the compound of Formula (I), specifically Formula (Ia), to produce a Z-isomer thereof; and storing the Z-isomer of the compound of Formula (I) for a period of time.

The activating includes exposing the compound of Formula (I), specifically Formula (Ia), of the energy storage device to sunlight or light having a wavelength in the visible spectrum.

The light energy stored during the activating can be released as thermal energy by inducing the Z-isomer of the compound of Formula (I), specifically Formula (Ia), to isomerize back to E-isomer state, to release energy stored during the activating. At least two cycles of the activating, storing, and inducing can be performed.

By including one or more compounds of Formula (I), there is a possibility to use a wider range of wavelengths when irradiating the system. Activating can involve heat and/or photon absorption, such as by using sunlight or fluorescent light. Depending on the compound(s) included in the system, the optimal wavelength of the irradiation can be determined and then utilized. Regardless of the manner of activation, the step involves solid-to-liquid phase change of the compound or composition of the invention.

The period of energy storage may be cyclical, such as on a daily cycle where the storage period may be several hours (e.g., up to 12 or 18 hours), but it may be desirable to extend the period of storage such that it is acyclical (e.g., for as long as a user desires). As indicated in the examples, several of the compounds can store energy for long periods of time over several days, several weeks, and over several months. In an embodiment, storing can be carried out for a period of time exceeding 12 hours. For example, storing is carried out for a period of time exceeding 24 hours, 36 hours, 48 hours, or 72 hours. Alternatively, storing can be carried out for a period of time from about 1 day up to about 21 days, about 2 days up to about 18 days, about 2 days up to about 14 days, about 3 days up to about 14 days, about 3 days up to about 10 days, or about 3 days up to about 7 days.

Having stored the energy for later use, the method also includes inducing the Z-isomer of the one or more compounds of Formula (I) to isomerize back to E-isomer state, thereby releasing energy stored during said activating. The energy released when one or more compounds of Formula (I) isomerize back to E-isomer state is collected and/or transferred, if desired.

The inducing step of step can optionally be an optically triggered crystallization. The optically triggered crystallization can occur below room temperature. For example, the optically triggered crystallization can occur below 21° C., below 20° C., below 19° C., below 18° C., below 17° C., below 16° C., below 15° C., below 14° C., below 13° C., below 12° C., below 11° C., below 10° C., below 9° C., below 8° C., below 7° C., below 6° C., below 5° C., below 4° C., below 3° C., below 2° C., below 1° C., below 0° C., below −1° C., below −2° C., below −3° C., below −4° C., or below −5° C. In an embodiment, the optically triggered crystallization can be induced by exposing the Z-isomer to light in the ultraviolet (UV) or visible (Vis) spectrum.

In an embodiment, the induced energy release by the compounds of Formula (I) is at least 50 kJ/mol or 55 kJ/mol, preferably at least 60 kJ/mol, 65 kJ/mol, 70 kJ/mol, 75 kJ/mol, 80 kJ/mol, 85 kJ/mol, or 90 kJ/mol.

Based on the foregoing, it should be apparent that it is contemplated that the method can be carried out repeatedly, with multiple cycles of the activating, storing, and inducing steps.

The compounds the compound of Formula (I), specifically Formula (Ia), have shown the surprising combination of properties when used to carry out this method. For example, it is possible to control (i) the absorption spectrum of the compound s the compound of Formula (I), specifically Formula (Ia) in E-isomer state; and/or (ii) the energy storage half-life of the compounds of the compound of Formula (I), specifically Formula (Ia), in Z-isomer state. Based on these combinations of unique properties, the storage devices using the compounds of Formula (I), specifically Formula (Ia), make it possible to store energy for at least 14 days, while simultaneously having an absorption spectrum where the wavelength of absorption onset is of at least 300 nm.

More specifically, preferred methods of storing energy include using the compounds according to Formula (I), as herein defined, to control (i) the absorption spectrum of the compound of Formula (I), such that the compound of Formula (I) in E-isomer state exhibits wavelength absorption of between about 300 nm to about 650 nm; (ii) the energy storage half-life of the one or more compounds of Formula (I) in Z-isomer state has an energy storage half-life of at least 14 days, with a preferred energy storage half-life of at least 50 days, with a much preferred energy storage half-life of at least 100 days, with a very much preferred energy storage half-life of at least 500 days; and (iii) the compounds of Formula (I), (Ia) exhibiting release of at least 50 kJ/mol or 55 kJ/mol, preferably at least 60 kJ/mol, 65 kJ/mol, 70 kJ/mol, 75 kJ/mol, 80 kJ/mol, 85 kJ/mol, or 90 kJ/mol. Specific embodiments have achieved storage of 0.15 MJ/kg of thermal energy for weeks over a wide range of temperatures (−40° C. to +110° C.) in liquid phase.

Due to the activity of the compounds of Formula (I), specifically Formula (Ia), the compounds have a ground state (OFF state) that is a crystalline solid. Due to exposure to light of appropriate wavelength or high temperature, the compounds of formula (I) are rendered amorphous, and irradiation (using light of appropriate wavelength) changes the switch to a metastable state (ON state) and "locks" the amorphous phase. The step of irradiation can be carried out for a period of time sufficient to lock the amorphous phase in the metastable state; typically this is from several minutes to several hours depending on the compound, the light source, and the intensity of the light. The stabilized amorphous phase can then be stored for a desired period of time and allowed to cool to ambient temperature, and it can optionally be moved from one location (where it was activated to the ON state) to another location, such as a reservoir or a location where release and heat recovery occurs. For the release, irradiation induces crystallization by changing the switch back to its ground state (i.e., turning off the switch).

In addition to the foregoing utilities described above, organic photoswitches that undergo reversible changes upon light irradiation have been integrated into various materials for applications, including light-driven actuation, drug delivery, sensing, and optical memory (Han et al., "Optically-controlled Long-term Storage and Release of Thermal Energy in Phase-change Materials," Nature Communications 8:1446 (2017), which is hereby incorporated by reference in its entirety). These additional utilities are also contemplated for the compounds and compositions described herein.

EXAMPLES

The following examples are provided to illustrate the present disclosure. The examples are merely illustrative and are not intended to limit devices made in accordance with the disclosure to the materials, conditions, or process parameters set forth therein.

General Methods

All reagents and starting materials were purchased from commercial vendors and used as supplied unless otherwise indicated. All dry solvents were obtained from the solvent system and dry triethylamine was distilled from $CaH_2$ and freshly used.

All reactions were monitored by thin-layer chromatography (TLC) using Merck silica gel 60 F254 plates (0.25 mm). TLC plates were visualized using UV light (254 nm). Silica column chromatography was performed using Merck Silica Gel 60 (230-400 mesh).

Deuterated solvents were purchased from Cambridge Isotope Laboratories, Inc. and used as received. $^1$H NMR and $^{13}$C NMR were recorded on a Varian INOVA400 spectrometer at 400 MHz. Chemical shifts are quoted in ppm relative to tetramethylsilane (TMS) using the residual solvent peak as the reference standard.

ESI mass spectra were obtained on a Waters Quattro II ESI mass spectrometer.

UV-Vis Absorbance Spectroscopy. UV-Vis adsorption spectra of compounds 1-3 were obtained with a Cary 60 Bio UV-vis spectrophotometer in a UV Quartz cuvette with a path length of 10 mm. Compounds were dissolved in DMSO. The UV-vis absorption was first recorded in dark for 3-5 min, then samples were irradiated with a specified wavelength until no change in their absorbance was observed. Samples were irradiated with a series of Thorlabs LEDs: M340L4 (340 nm, 2.22 µW/mm$^2$, 60 mW), M365LP1 (365 nm, 21.0 µW/mm$^2$, 2000 mW), and M430L4 (430 nm, 35.3 µW/mm$^2$, 600 mW). The condensed state UV-vis adsorption spectra of compounds 1-3 were collected with the same spectrophotometer using ultra-thin films (0.7-1.3 µm thick).

Thermal Half-life Measurements. Solutions of compounds 1-3 in DMSO were prepared and then irradiated at 365/340 nm to obtain a Z-rich state. The solutions were then heated at elevated temperatures in dark. The change in the concentration of the E isomer as a function of time was monitored, and the half-lives were obtained based on Eyring-Polanyi plots.

Differential Scanning calorimetry (DSC). DSC analysis was conducted on a DSC 250 (TA Instruments) with an RSC 90 cooling component. All samples were heated to 250° C. and cooled to −90° C. before reheating. E isomers of the compounds were heated and cooled at a rate of 10° C./min, while Z isomers were heated and cooled at a rate of 5° C./min to distinguish between isomerization and phase transition.

Preparation of Z-isomer Samples for DSC Measurements. Z-isomers were obtained by dissolving each E-isomer in dichloromethane and irradiating the sample with an appropriate wavelength of light until the photostationary state was reached. Z-rich samples were concentrated, dried under high-vacuum, and then transferred to DSC pans for analysis. $^1$H NMR spectra were taken before the DSC measurements to determine the percentage of Z isomers in the samples.

Thin Film Experiments. Thin-film samples were prepared by drop-casting 100 µL of 0.01 M DMSO solution of E isomers on a clean glass slide (2.5×2.5 cm$^2$) and heating them on a hot plate at 100° C. until the solvent completely evaporated. Then the samples were slowly cooled to room temperature. The temperature was controlled using a VWR Advanced hot plate stirrer. The thickness of the films was then measured using Zeta-20 Optical Profilometer.

E-Z reversible photoisomerization of thin film samples of compounds 1-3 was achieved by the direct irradiation of 365/340 nm LEDs for 1 to 3 hours at room temperature. Z-E photoisomerization was achieved by the irradiation with 430 nm LED for 15 min at room temperature.

The UV-Vis spectra of thin films were obtained from the center of the films, and the percentage of Z isomers in the film was obtained by the $^1$H-NMR spectroscopy of the dissolved central part of films.

Powder X-ray Diffraction (PXRD) Measurements. X-ray powder diffraction measurements in the 2θ range of 0-35° (step size, 0.014°; time/step, 20 s; 0.04 rad soller; 40 mA×60 kV) were collected on a PANalytical Empyrean diffractometer equipped with an GaliPIX3D line detector and in Bragg-Brentano geometry, using Mo-Kα radiation (λ=0.7093187 Å) without a monochromator. Around 5 mg of the samples were loaded into capillary tubes (outer diameter=0.7 mm), and the measurements were carried out on the capillary spinner.

Gas Adsorption Measurements. $N_2$ adsorption-desorption isotherms of all samples were acquired at 77 K using a Micrometritics analyzer 3Flex at center for nanoscale systems (CNS). All gas adsorption measurements were carried out by first degassing samples at 150° C. for E isomers or at room temperature in dark for Z isomers overnight to minimize thermal reversion. The Brunauer, Emmet, Teller (BET) model was used to evaluate the specific surface areas on the $N_2$ adsorption isotherm collected at 77 K.

Synthetic Procedures

The compounds S1-S4 were synthesized according to reported procedures (Boldog, I. et al., "When Does a Supramolecular Synthon Fail? Comparison of Bridgehead-Functionalized Adamantanes: The Tri- and Tetra-Amides and Amine Hydrochlorides" Cryst. Growth Des. (2019) Vol. 19, No. 9, pp. 5218-5227; Sayed, S. M., et al., "Generation of Liquid Crystallinity from a Ta-Symmetry Central Unit," Soft Matter. (2016), Vol. 12, No. 28, pp. 6148-6156; Lee, G. S. et al. "Photochemical Preparation of 1,3,5,7-Tetracyanoadamantane and Its Conversion to 1,3,5,7-Tetrakis(Aminomethyl)Adamantane" Org. Lett. (2004), Vol. 6, No. 11, pp. 1705-1707; Ernst, C. et al., "The Symmetric Tetravalent Sulfhydryl-Specific Linker NATBA Facilitates a Combinatorial "Tool Kit" Strategy for Phage Display-Based Selection of Functionalized Bicyclic Peptides," ACS Omega (2018) Vol. 3, No. 10, pp. 12361-12368.

The identity of the compounds was confirmed by comparing the obtained $^1$H NMR spectra with the spectra published in the literature. Scheme 1 shows an overview of the synthetic pathway to obtain adamantane precursors.

Scheme 1.

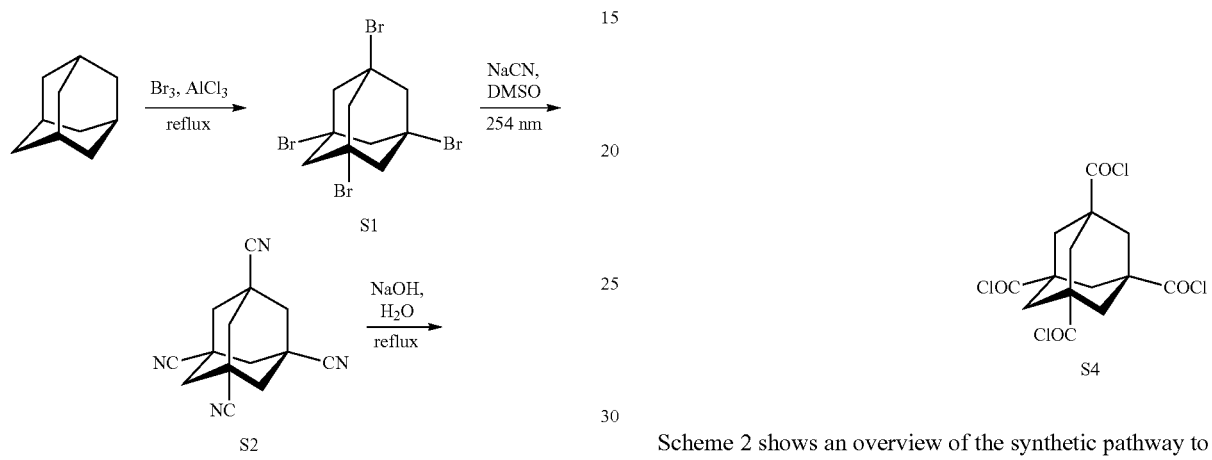

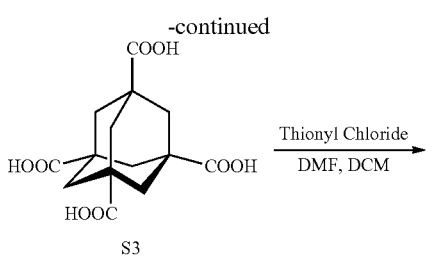

Scheme 2 shows an overview of the synthetic pathway to obtain compound 1.

Scheme 2

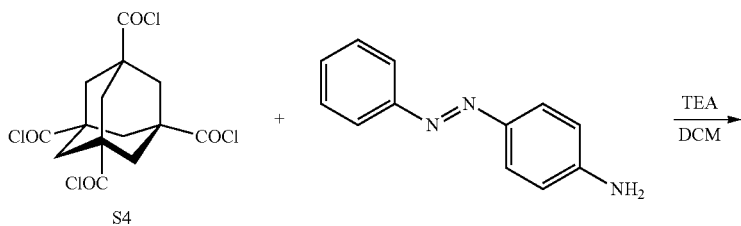

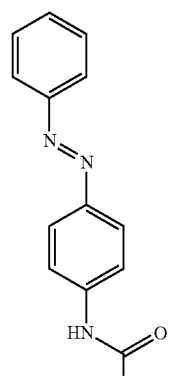

-continued

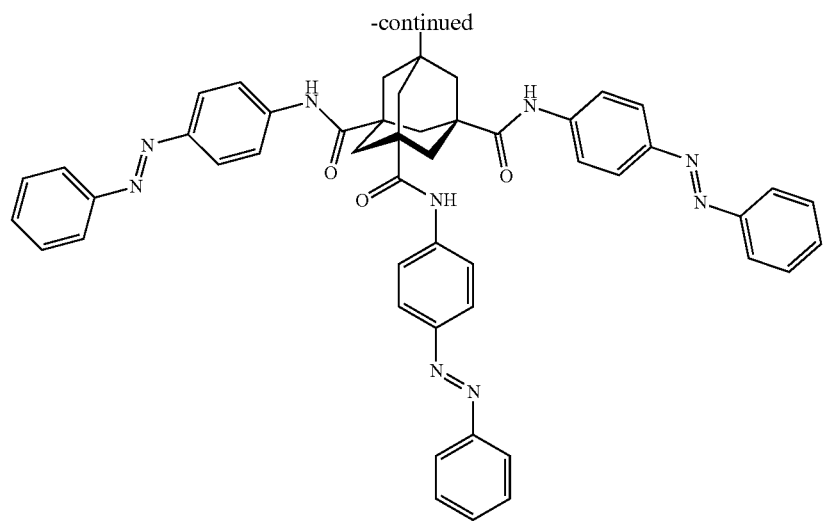

1

Compound 1. First, 4-aminoazobenzene (198.4 mg, 1.0 mmol, 5.1 eq.) was added to a 25 mL flamed-dried Argon-filled round-bottom flask with 2 mL dry DCM, and 0.15 mL dry triethylamine was added to the above solution. After stirring for 10 min, S4 (76.4 mg, 0.2 mmol, 1 eq.) in 5 mL dry DCM was added dropwise to the reaction mixture within 15 min. Then the mixture was stirred under argon atmosphere overnight. The solution was washed with brine and extracted with DCM 3 times. The solvent was removed under vacuum and the reaction mixture was washed with chloroform to remove extra 4-aminoazobenzene. Pure product compound 1 was obtained with a yield of 83.4 mg, 40.5%. $^1$H NMR (400 MHz, DMSO-$d_6$) δ 9.83 (s, 4H), 7.98 (d, J=12, 8H), 7.93 (d, J=12, 8H), 7.87 (d, J=8, 8H), 7.58 (m, 12H), 3.33 (s, H$_2$O), 2.30 (s, 12H) ppm. $^{13}$C NMR (100 MHz, DMSO-$d_6$) δ 174.65, 151.99, 147.23, 130.98, 129.34, 123.38, 122.27, 120.30, 43.40, 37.69 ppm. HRMS: ESI-MS: m/z found [M-H+] for $C_{62}H_{52}N_{12}O_4^+$ 1029.4277 (calcd. 1029.43).

Compound S5. 4-[2-(Boc-amino)ethyl]aniline (385.4 mg, 1.63 mmol, 1 eq.) was dissolved in 5 mL DCM in a 25 mL RBF, and nitrosobenzene (196.7 mg, 1.84 mmol, 1.1 eq.) was added to the solution. Then 1 mL of concentrated acetic acid was added dropwise to the above solution. The solution was stirred at room temperature overnight. The reaction mixture pH was adjusted with sat. NaHCO$_3$ solution until a pH of about 8 was reached. Then the solution was diluted with DCM and washed with sat. NaHCO$_3$ solution and brine. The organic layer was combined and dried with anhydrous MgSO$_4$. The solvent was removed under vacuum, and the resulting crude product was purified by column chromatography (SiO$_2$, Hexane:Ethyl Acetate (EtOAc), 85:15) to yield a red solid (389.8 mg, 73.5% yield). $^1$H NMR (400 MHz, CDCl$_3$) δ 7.92 (d, J=7.6 Hz, 2H), 7.88 (d, J=8 Hz, 2H), 7.52 (t, J=6.8 Hz, 2H), 7.47 (t, J=7.2 Hz, 1H), 7.35 (d, J=8.4 Hz, 2H), 4.56 (s, 1H), 3.42 (t, J=6.4, 3H), 2.89 (t, J=6.8, 3H), 1.44 (s, 9H) ppm.

Compound S6. Compound S5 from the previous step was dissolved in dichloromethane (DCM), and 1.4 mL of trifluoroacetic acid was added to the solution. The reaction mixture was stirred at room temperature for 1 h. The pH of the reaction mixture was then adjusted to a pH of ~8 by adding sat. NaHCO$_3$ solution. The solution was diluted with DCM and washed with sat. NaHCO$_3$ solution and brine. The organic layer was combined and dried with anhydrous MgSO$_4$. The solvent was removed under vacuum and the pure product was obtained as a red solid (222.7 mg, 82.5% yield). $^1$H NMR (400 MHz, CD$_3$OD) δ 7.88 (d, J=9.2 Hz, 2H), 7.88 (d, J=11.2 Hz, 2H), 7.54 (t, J=6.8 Hz, 2H), 7.51 (t, J=6.4 Hz, 1H), 7.43 (d, J=8.4 Hz, 2H), 2.94 (t, J=6.4, 2H), 2.86 (t, J=7.2, 2H) ppm.

Scheme 3 shows the synthesis of Compound 2.

Scheme 3.

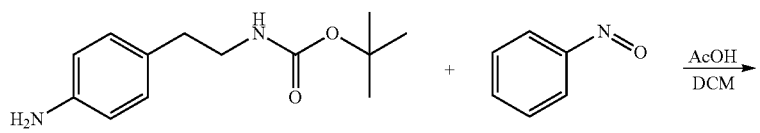

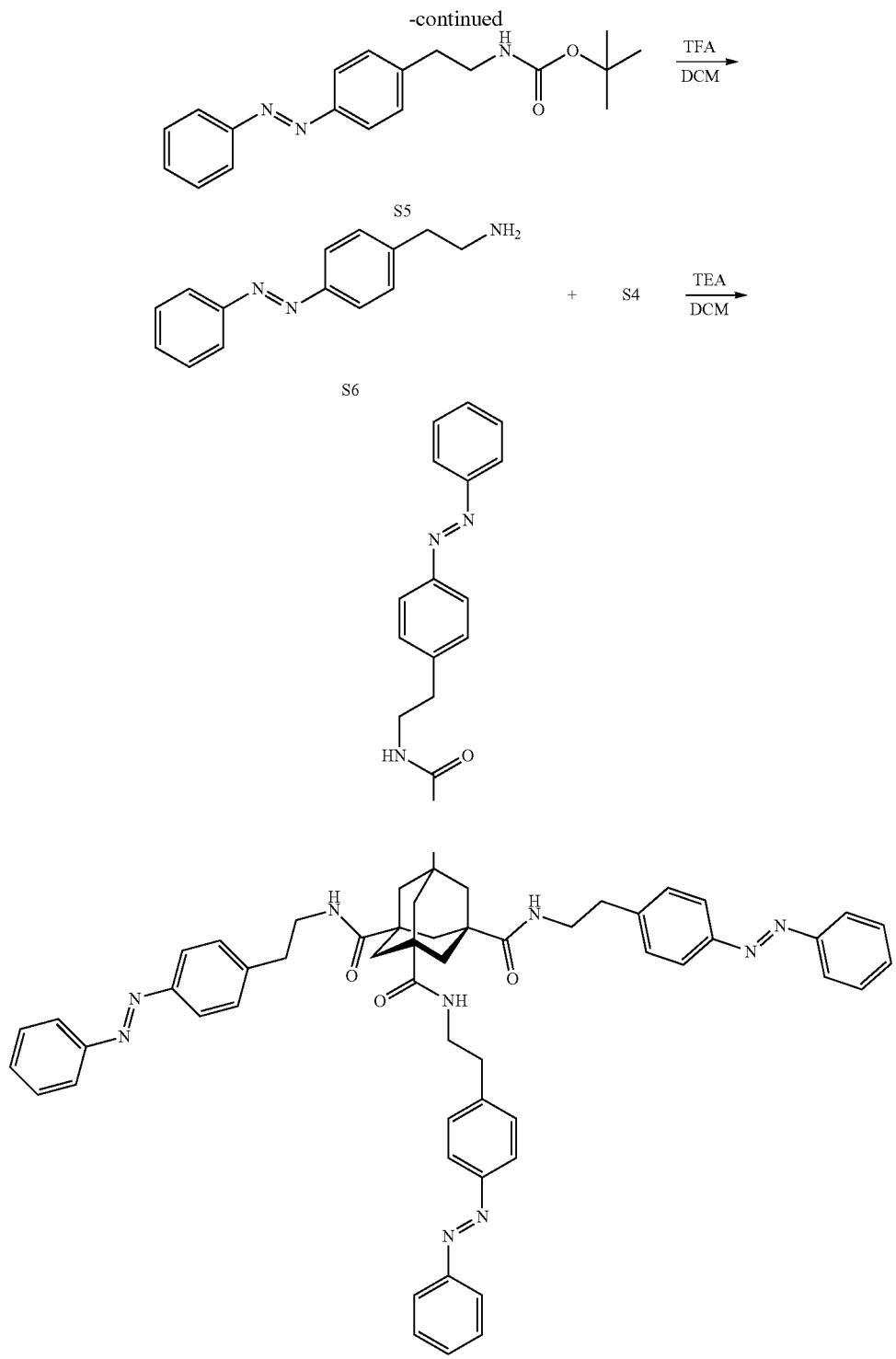

Compound 2. The synthesis procedure of compound 2 was the same as compound 1. The resulting crude product was purified by column chromatography (SiO$_2$, DCM:Methanol (MeOH), 98:2) to yield a yellow solid (94.3 mg, 41.3% yield). $^1$H NMR (400 MHz, DMSO-d$_6$) δ 7.82 (t, J=8 Hz, 16H), 7.65 (t, J=5.2 Hz, 4H), 7.53 (d, J=5.2 Hz, 12H), 7.40 (d, J=7.6 Hz, 8H), 5.75 (s, DCM), 3.35 (m, 8H+H$_2$O), 2.83 (t, J=6.8 Hz, 8H), 2.08 (s, Acetone), 1.73 (s, 12H) ppm. $^{13}$C NMR (100 MHz, DMSO-d$_6$) δ 175.42, 151.90, 150.40, 143.64, 131.18, 129.71, 122.49, 122.34, 41.76, 34.94, 30.62 ppm. HRMS: ESI-MS: m/z found [M-H+] for C$_{70}$H$_{68}$N$_{12}$O$_4^+$ 1141.5546 (calcd. 1141.55).

Scheme 4 shows an overview of the synthetic pathway to obtain compound 3.

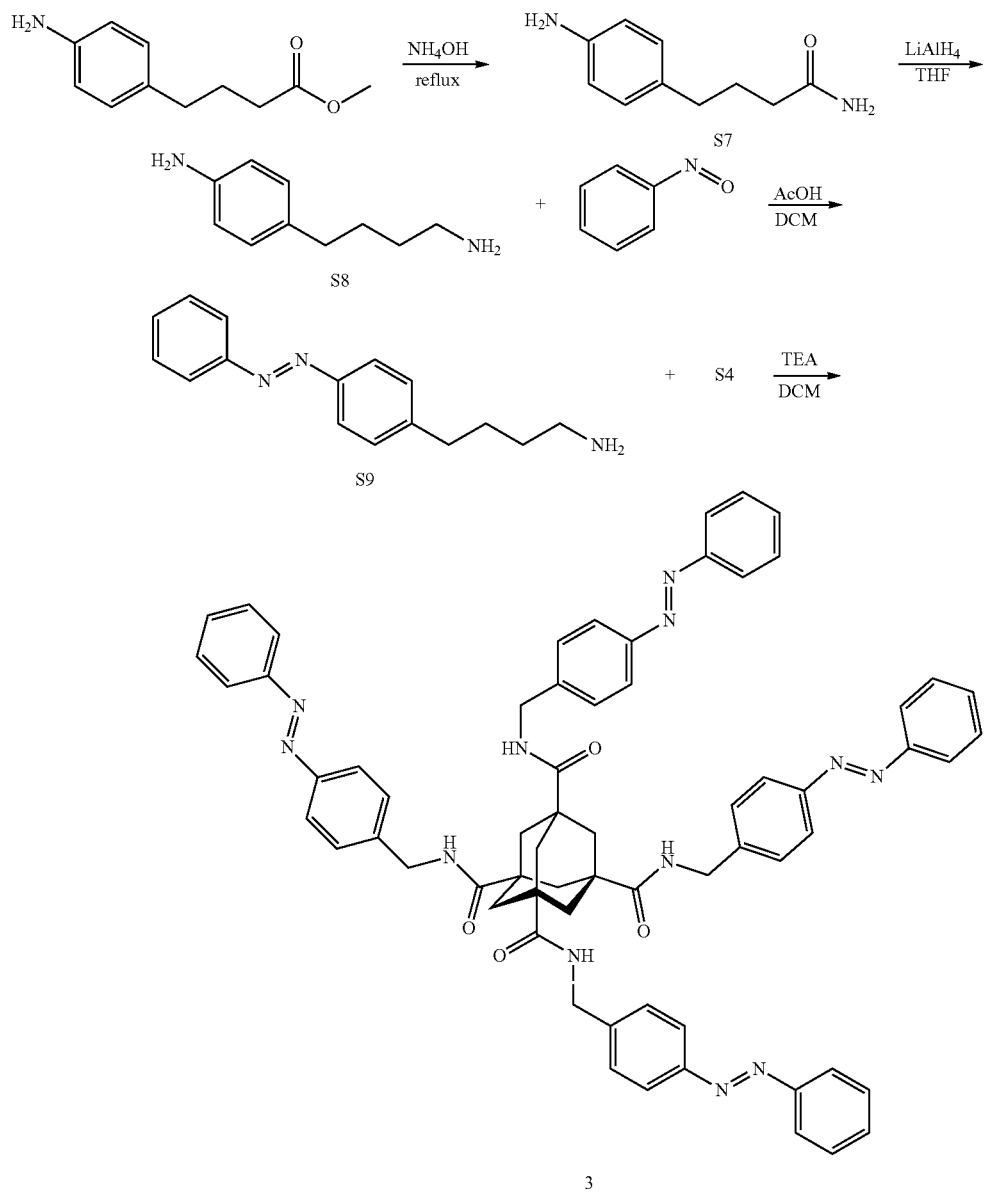

Scheme 4

Compound S7. Methyl 4-(4-aminophenyl) butanoate (919.6 mg, 4.8 mmol, 1 eq.) was dissolved in 18 mL methanol, and added to the solution was 36 mL ammonia solution. The reaction mixture was refluxed overnight. The mixture was then cooled to room temperature and evaporated under vacuum to remove residual methanol. The solution was extracted with DCM and washed with water and brine. The organic layer was combined and dried with anhydrous MgSO$_4$. The solvent was removed under vacuum and the pure product was obtained as an off-white solid (304.0 mg, 35.5% yield). $^1$H NMR (400 MHz, CDCl$_3$) δ 6.98 (d, J=8 Hz, 2H), 6.64 (d, J=8 Hz, 2H), 3.59 (s, 2H), 2.56 (t, J=7.6 Hz, 2H), 2.20 (t, J=7.6 Hz, 2H), 1.92 (qui, J=7.2 Hz, 2H) ppm.

Compound S8. Compound S7 was dissolved in 10 mL dry THF in a 50 mL flame-dried Ar-filled RBF, and lithium aluminium hydride (142.2 mg, 3.7 mmol, 2.0 eq.) in 10 mL dry THF was added dropwise to the above solution. The reaction mixture was stirred at room temperature for 15 min and then refluxed for 1 h. The reaction was quenched by adding 0.15 mL DI water, 0.15 mL 4M NaOH solution, and an additional 0.45 mL DI water and stirred for another 15 min. The solution was dried by adding sufficient anhydrous MgSO$_4$. After filtration, the solvent was removed by evaporation under vacuum and a yellow oil was obtained as the product (213 mg, 70.1% yield). $^1$H NMR (400 MHz, CDCl$_3$) δ 6.96 (d, J=8.4 Hz, 2H), 6.63 (d, J=8 Hz, 2H), 3.54 (s, 2H), 2.69 (t, J=7.2 Hz, 2H), 2.51 (t, J=7.6 Hz, 2H), 1.59 (qui, J=6.8 Hz, 2H), 1.46 (qui, J=8 Hz, 2H) ppm.

Compound S9. The synthesis procedure of compound S9 was the same as compound S5. The product was purified by column chromatography (SiO$_2$, DCM:MeOH, 95:5) to yield a red solid (226.7 mg, 69.0% yield). $^1$H NMR (400 MHz, CDCl$_3$) δ 7.91 (d, J=7.2 Hz, 2H), 7.86 (d, J=8.4 Hz, 2H), 7.51 (t, J=6.8 Hz, 2H), 7.46 (t, J=7.2 Hz, 1H), 7.33 (d, J=8.4 Hz, 2H), 3.17 (s, 2H), 2.79 (t, J=7.2 Hz, 2H), 2.71 (t, J=8, 2H), 1.72 (qui, J=7.6 Hz, 2H), 1.58 (qui, J=6.8 Hz, 2H) ppm.

Compound 3. The synthesis procedure of compound 3 was the same as compound 1. And the resulting crude product was purified by column chromatography ($SiO_2$, pure DCM) to yield a yellow solid (80.5 mg, 32.1% yield). $^1$H NMR (400 MHz, $CDCl_3$) δ 7.90 (d, J=7.2 Hz, 8H), 7.85 (d, J=8.4 Hz, 8H), 7.50 (t, J=7.6 Hz, 8H), 7.46 (d, J=6.8 Hz, 4H), 7.29 (d, J=8.4 Hz, 8H+$CDCl_3$), 5.81 (t, J=5.6 Hz, 4H), 3.24 (q, J=6 Hz, 8H), 2.68 (t, J=7.6 Hz, 8H), 1.90 (s, 12H), 1.65 (q, J=7.2 Hz, 8H), 1.52 (q, J=7.2 Hz, 8H) ppm. $^{13}$C NMR (100 MHz, $CDCl_3$) δ175.22, 152.86, 151.24, 145.55, 130.87, 129.22, 129.17, 123.10, 122.86, 42.50, 39.61, 39.56, 35.41, 29.24, 28.46 ppm. HRMS: ESI-MS: m/z found [M-H+] for $C_{78}H_{84}N_{12}O_4$ 1253.6791 (calcd. 1253.67).

The compositions, methods, and articles can alternatively comprise, consist of, or consist essentially of, any appropriate materials, steps, or components herein disclosed. The compositions, methods, and articles can additionally, or alternatively, be formulated so as to be devoid, or substantially free, of any materials (or species), steps, or components, that are otherwise not necessary to the achievement of the function or objectives of the compositions, methods, and articles.

The terms "a" and "an" and "the" do not denote a limitation of quantity, but rather denote the presence of at least one of the referenced items. For example, the term "the compound of Formula (I)" means one compound or more than one compound of Formula (I). The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

In general, the compositions, methods, and articles can alternatively comprise, consist of, or consist essentially of, any ingredients, steps, or components herein disclosed. The compositions, methods, and articles can additionally, or alternatively, be formulated, conducted, or manufactured so as to be devoid, or substantially free, of any ingredients, steps, or components not necessary to the achievement of the function or objectives of the present claims.

Unless specified to the contrary herein, all test standards are the most recent standard in effect as of the filing date of this application, or, if priority is claimed, the filing date of the earliest priority application in which the test standard appears.

The endpoints of all ranges directed to the same component or property are inclusive of the endpoints, are independently combinable, and include all intermediate points and ranges. For example, ranges of "up to 25 wt %, or 5 to 20 wt %" is inclusive of the endpoints and all intermediate values of the ranges of "5 to 25 wt %," such as 10 to 23 wt %, etc.

The term "combination" is inclusive of blends, mixtures, alloys, reaction products, and the like. Also, "at least one of" means that the list is inclusive of each element individually, as well as combinations of two or more elements of the list, and combinations of at least one element of the list with like elements not named.

The term "alkyl", "hydrocarbon", "saturated hydrocarbon" means an aliphatic hydrocarbon group which may be straight or branched having a recited number of carbon atoms in the chain. Branched means that one or more lower alkyl groups such as methyl, ethyl or propyl are attached to a linear alkyl chain. Exemplary alkyl groups include methyl, ethyl, n-propyl, i-propyl, n-butyl, t-butyl, n-pentyl, and 3-pentyl.

The term "unsaturated hydrocarbon" means alkenyl or alkynyl. The term "alkenyl" means an aliphatic hydrocarbon group containing a carbon-carbon double bond and which may be straight or branched having a recited number of carbon atoms (at least two) in the chain. Branched means that one or more lower alkyl groups such as methyl, ethyl, or propyl are attached to a linear alkenyl chain. Exemplary alkenyl groups include ethenyl, propenyl, n-butenyl, and i-butenyl.

The term "alkoxy" means groups of carbon atoms of a straight, branched, or cyclic configuration and combinations thereof attached to the parent structure through an oxygen. Examples include methoxy, ethoxy, propoxy, isopropoxy, butoxy, cyclopropyloxy, cyclohexyloxy, and the like. Alkoxy also includes methylenedioxy and ethylenedioxy in which each oxygen atom is bonded to the atom, chain, or ring from which the methylenedioxy or ethylenedioxy group is pendant so as to form a ring.

The term "aryl" is inclusive of heteroaryl and means an aromatic monocyclic or multicyclic ring system of 6 to about 14 carbon atoms, preferably of 6 to about 10 carbon atoms. Representative aryl groups include phenyl and naphthyl. The term "heteroaryl" means an aromatic monocyclic ring system of 5 or 6 ring atoms, in which one or more of the atoms in the ring system is/are element(s) other than carbon, for example, nitrogen, oxygen, or sulfur. The prefix aza, oxa, thia, or thio before heteroaryl means that at least a nitrogen, oxygen, or sulfur atom, respectively, is present as a ring atom. A nitrogen atom of a heteroaryl is optionally oxidized to the corresponding N-oxide. Representative heteroaryls include pyridyl, 2-oxo-pyridinyl, pyrimidinyl, pyridazinyl, pyrazinyl, triazinyl, furanyl, pyrrolyl, thiophenyl, pyrazolyl, imidazolyl, oxazolyl, isoxazolyl, thiazolyl, isothiazolyl, triazolyl, oxadiazolyl, thiadiazolyl, tetrazolyl, indolyl, isoindolyl, benzofuranyl, benzothiophenyl, indolinyl, 2-oxoindolinyl, dihydrobenzofuranyl, dihydrobenzothiophenyl, indazolyl, benzimidazolyl, benzooxazolyl, benzothiazolyl, benzoisoxazolyl, benzoisothiazolyl, benzotriazolyl, benzo[1,3]dioxolyl, quinolinyl, isoquinolinyl, quinazolinyl, cinnolinyl, pthalazinyl, quinoxalinyl, 2,3-dihydrobenzo[1,4]dioxinyl, benzo[1,2,3]triazinyl, benzo[1,2,4]triazinyl, 4H-chromenyl, indolizinyl, quinolizinyl, 6aH-thieno[2,3-d]imidazolyl, 1H-pyrrolo[2,3-b]pyridinyl, imidazo[1,2-a]pyridinyl, pyrazolo[1,5-a]pyridinyl, [1,2,4]triazolo[4,3-a]pyridinyl, [1,2,4]triazolo[1,5-a]pyridinyl, thieno[2,3-b]furanyl, thieno[2,3-b]pyridinyl, thieno[3,2-b]pyridinyl, furo[2,3-b]pyridinyl, furo[3,2-b]pyridinyl, thieno[3,2-d]pyrimidinyl, furo[3,2-d]pyrimidinyl, thieno[2,3-b]pyrazinyl, imidazo[1,2-a]pyrazinyl, 5,6,7,8-tetrahydroimidazo[1,2-a]pyrazinyl, 6,7-dihydro-4H-pyrazolo[5,1-c][1,4]oxazinyl, 2-oxo-2,3-dihydrobenzo[d]oxazolyl, 3,3-dimethyl-2-oxoindolinyl, 2-oxo-2,3-dihydro-1H-pyrrolo[2,3-b]pyridinyl, benzo[c][1,2,5]oxadiazolyl, benzo[c][1,2,5]thiadiazolyl, 3,4-dihydro-2H-benzo[b][1,4]oxazinyl, 5,6,7,8-tetrahydro-[1,2,4]triazolo[4,3-a]pyrazinyl, [1,2,4]triazolo[4,3-a]pyrazinyl, 3-oxo-[1,2,4]triazolo[4,3-a]pyridin-2(3H)-yl, and the like. Preferred heteroaryls include imidazolyl, oxazolyl, isoxazolyl, thiazolyl, and isothiazolyl rings.

The term "halogen" means fluoro, chloro, bromo, or iodo.

The term "substituted" or "substitution" of an atom means that one or more hydrogen on the designated atom is replaced with a selection from the indicated group, provided that the designated atom's normal valency is not exceeded.

"Unsubstituted" atoms bear all of the hydrogen atoms dictated by their valency. When a substituent is keto (i.e., =O), then two hydrogens on the atom are replaced. Combinations of substituents and/or variables are permissible only if such combinations result in stable compounds; by "stable compound" or "stable structure" is meant a compound that is sufficiently robust to survive isolation to a useful degree of purity from a reaction mixture.

Unless defined otherwise, technical and scientific terms used herein have the same meaning as is commonly understood by one of skill in the art to which this invention belongs.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

The invention claimed is:

1. A compound of Formula (I)

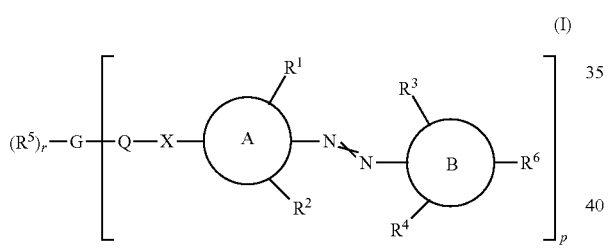

(I)

wherein
each $R^5$ and $R^6$ is independently $C_{1-6}$ alkyl, $C_{1-6}$ alkoxy, halogen, trihalomethyl, or cyano;
G is a $C_{2-36}$ hydrocarbon;
Q is —C(O)O—, —C(S)O—, —C(O)NH—, —C(O)S—, —C(S)NH—, —NHC(O)NH—, —NHC(S)NH—, or —C(O)NHC(O)—;
X is a bond or a $C_{1-30}$ straight- or branched-chain, saturated or unsaturated hydrocarbon;

are each independently aryl or heteroaryl 5- or 6-membered rings;
each of $R^1$, $R^2$, $R^3$, and $R^4$ is in an ortho position to the azo group, and is independently halogen, $C_{1-6}$ alkoxy, $C_{1-6}$ alkylthio, halomethyl, dihalomethyl, trihalomethyl, or di($C_{1-6}$ alkyl)amino;
r is 0 to 6; and
p is 1 to 10, or 2 to 8, or 2 to 6, or 4 to 6, provided that r+p does not exceed the valence of G.

2. The compound of claim 1, wherein G is a saturated or unsaturated $C_{6-36}$ monocyclic or polycyclic hydrocarbon having rigidity and a three-dimensional conformation.

3. The compound of claim 1, wherein G is adamantyl, triptycene, or tetraphenylmethane.

4. The compound of claim 1, wherein
each $R^5$ and $R^6$ is independently $C_{1-3}$ alkyl, $C_{1-3}$ alkoxy, halogen, trihalomethyl, or cyano; or
each $R^5$ and $R^6$ is independently methyl, methoxy, chlorine, fluorine, or trifluoromethyl.

5. The compound claim 1, wherein Q is —C(O)O—, —C(O)NH—, or —OC(S)—.

6. The compound of claim 1, wherein
X is a bond; or
X is $C_{1-30}$ straight-chain, saturated or unsaturated hydrocarbon; or
X is a $C_{2-20}$ saturated or unsaturated hydrocarbon; or
X is a $C_{1-12}$ alkylene.

7. The compound of claim 1, wherein

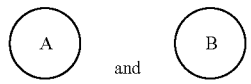

are each independently phenyl, imidazolyl, oxazolyl, isoxazolyl, thiazolyl, or isothiazolyl.

8. The compound of claim 1, wherein

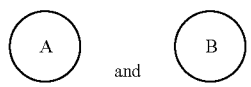

are each the same, and are phenyl.

9. The compound of claim 1, wherein
each of $R^1$, $R^2$, $R^3$, and $R^4$ is independently the same or different halogen; or
each of $R^1$, $R^2$, $R^3$, and $R^4$ is the same and is F, Cl, or Br; or
each of $R^1$, $R^2$, $R^3$, and $R^4$ is the same and is F or Cl; or
two of $R^1$, $R^2$, $R^3$, and $R^4$ are F, and the other two of $R^1$, $R^2$, $R^3$, and $R^4$ are Cl;
each of $R^1$, $R^2$, $R^3$, and $R^4$ is independently ethoxy or methoxy.

10. The compound of claim 1, of the formula (Ia)

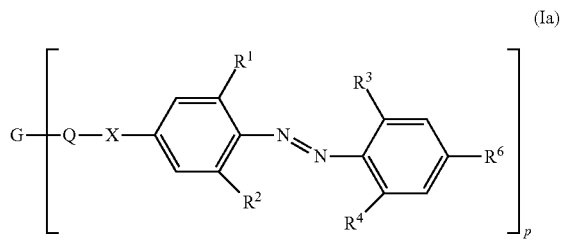

(Ia)

wherein
G is a $C_{8-36}$ monocyclic or polycyclic hydrocarbon;
Q is —C(O)O— or —C(O)NH—;
X is a single bond or a $C_{1-6}$ straight-chain alkylene;
each of $R^1$, $R^2$, $R^3$, and $R^4$ is independently the same or different halogen; or each of $R^1$, $R^2$, $R^3$, and $R^4$ is the same and is F, Cl, or Br, or
each of $R^1$, $R^2$, $R^3$, and $R^4$ is the same and is F or Cl; or
two of $R^1$, $R^2$, $R^3$, and $R^4$ are F, and the other two of $R^1$, $R^2$, $R^3$, and $R^4$ are Cl;

each of $R^1$, $R^2$, $R^3$, and $R^4$ is ethoxy or methoxy; and
p is 2, 3, 4, 5, 6, 7, 8, 9, or 10.

11. The compound of claim 10, wherein the compound of Formula Ia is of the formula (I), or of formula (II), or of formula III:

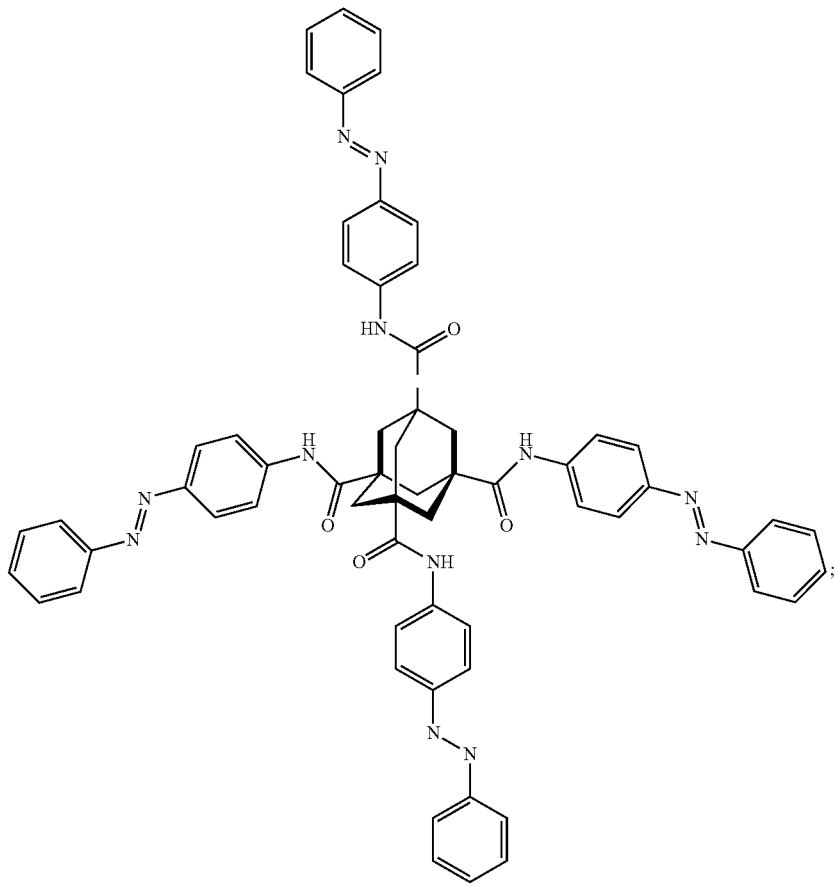

(1)

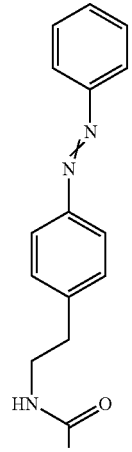

(2)

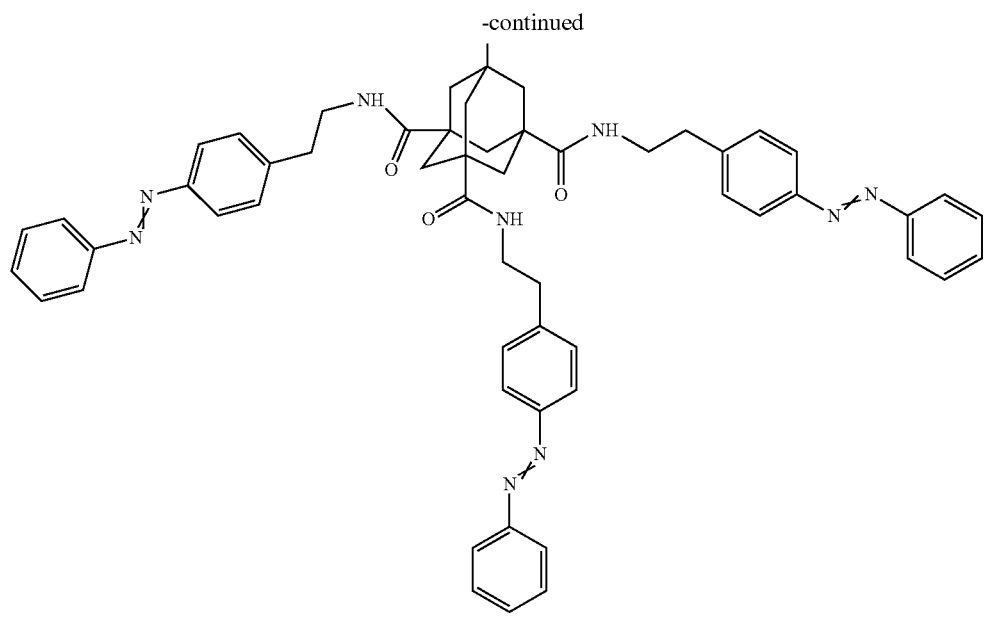
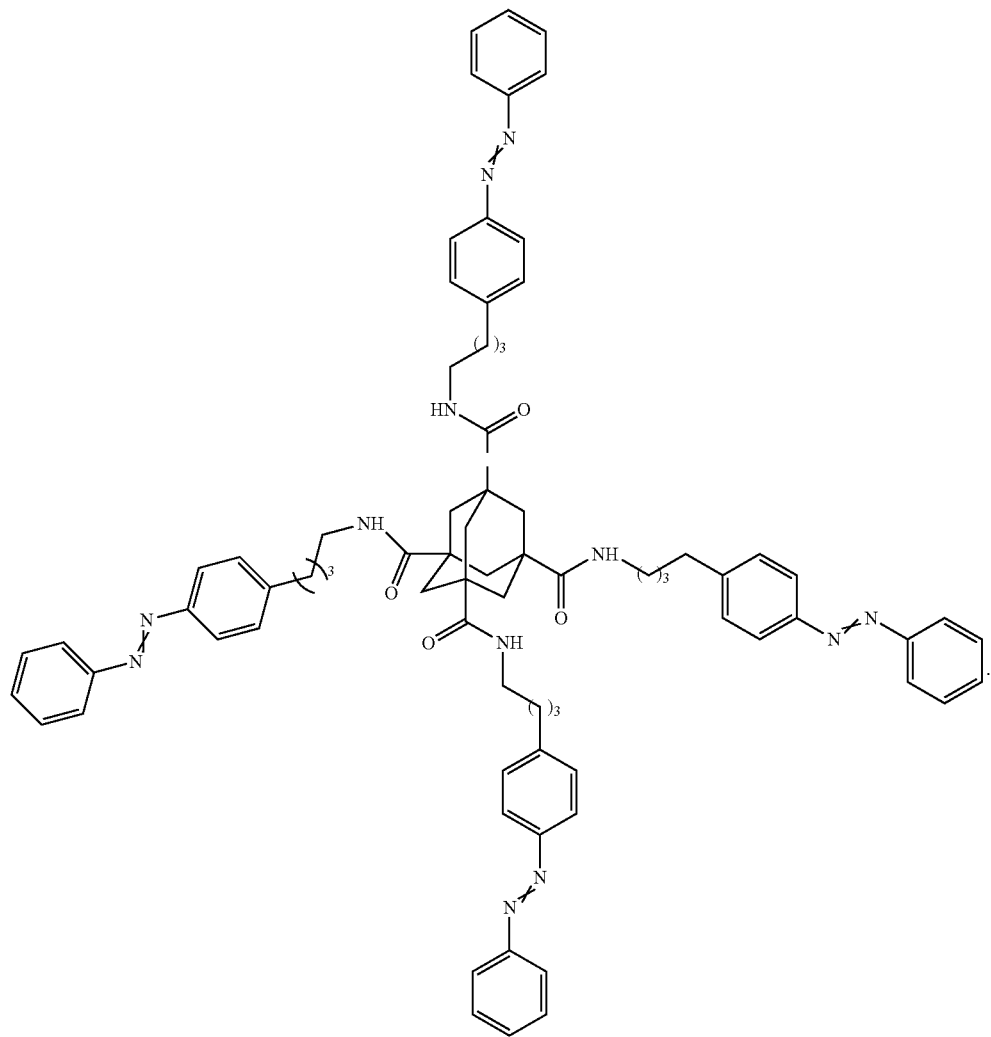
(3)

12. A composition comprising a compound of Formula (I) of claim 1, wherein the composition is a solid composition in the form of a film.

13. The composition according to claim 12, wherein the composition comprises a polymer in which the compound of Formula (I) is dispersed.

14. The composition according to claim 10, wherein the compound of Formula (I) is present in the form of a Z-isomer, an E-isomer, or a mixture of a Z-isomer and an E-isomer.

15. A composite structure comprising a porous structural component and a compound according to claim 1.

16. A composite structure comprising a porous structural component and a composition according to claim 10.

17. A method of storing energy comprising:
providing an energy storage device comprising the compound of Formula (I) of claim 1 as a thermal-storage material, wherein the compound of Formula (I) is present as an E-isomer;
exposing the compound of Formula (I) of the energy storage device to sunlight or light having a wavelength in the visible spectrum to activate the compound of Formula (I) to produce a Z-isomer thereof; and
storing the Z-isomer of the compound of Formula (I) for a period of time.

18. The method of claim 17, further comprising:
inducing the Z-isomer of the compound of Formula (I) to isomerize back to E-isomer state, to release energy stored during the activating.

19. The method of claim 18, comprising at least two cycles of the activating, storing, and inducing.

20. A thermal storage system comprising
the composition of claim 10,
a compartment enclosing the composition and comprising an optically transparent portion;
a light source that emits a wavelength of light effective to induce an isomeric phase change of the compound of formula (I),
a switch that controls operation of the light source, and either a power source or a connector adapted for connecting the thermal storage system to a power source.

21. A process for preparation of a compound of Formula (I) of claim 1, the process comprising:
reacting a compound of Formula (II)

$(R^5)_r$-G-W  (II), wherein
W is $-C(O)LG_1$-, $-C(S)LG_1$-, $-NHC(O)LG_1$-, $-NHC(S)LG_1$-, $-C(O)NHC(O)LG_1$-, $-NH_2$, or $-N{=}C{=}Y$ wherein $LG_1$ is a first leaving group,
with a compound of formula (III)

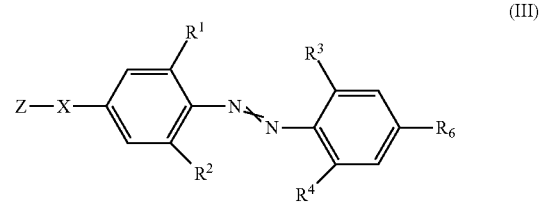

wherein
Z is $-OH$, $-SH$, $-NH_2$, or $-C(O)LG_2$ wherein $LG_2$ is a second leaving group, and
optionally, X is $-O-$;
under conditions effective to form the compound according to Formula (I).

* * * * *